US012127308B2

(12) United States Patent
Gray et al.

(10) Patent No.: US 12,127,308 B2
(45) Date of Patent: *Oct. 22, 2024

(54) ELECTRICALLY HEATED GARMENT

(71) Applicant: MILWAUKEE ELECTRIC TOOL CORPORATION, Brookfield, WI (US)

(72) Inventors: Rick Gray, Bothell, WA (US); Jonathan A. Zick, Waukesha, WI (US); Paul Fry, Sussex, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 273 days.

This patent is subject to a terminal disclaimer.

(21) Appl. No.: 17/826,410

(22) Filed: May 27, 2022

(65) Prior Publication Data

US 2022/0287153 A1 Sep. 8, 2022

Related U.S. Application Data

(63) Continuation of application No. 15/875,768, filed on Jan. 19, 2018, now Pat. No. 11,350,491, which is a (Continued)

(51) Int. Cl.
*H05B 1/02* (2006.01)
*A41D 13/005* (2006.01)

(52) U.S. Cl.
CPC ....... *H05B 1/0272* (2013.01); *A41D 13/0051* (2013.01)

(58) Field of Classification Search
CPC .......................... H05B 1/0272; A41D 13/0051
(Continued)

(56) References Cited

U.S. PATENT DOCUMENTS 1,691,472 A 11/1928 Graham et al.
1,702,583 A 2/1929 Williams
(Continued)

FOREIGN PATENT DOCUMENTS

CN 1258201 A 6/2000
DE 20012075 U1 11/2000
(Continued)

OTHER PUBLICATIONS

DEWBU, "DEWBU Heated Jacket for Women with 12V Battery Pack Winter Outdoor Soft Shell Electric Hearing Coat," <https://www.amazon.com/dp/B07HR9XHPF/ref=sspa_dk_detail_0?ie=UTF8&psc=1&pd_rd_i=B07HR9XHPFp13NParams&s=apparel&sp_%E2%80%A6> web page visited Jun. 6, 2023 (11 pages).
(Continued)

*Primary Examiner* — John J Norton
(74) *Attorney, Agent, or Firm* — Michael Best & Friedrich LLP

(57) ABSTRACT

An article of clothing includes a garment body, a heater coupled to the garment body, a heater supply cable in electrical communication with the heater, a battery pack including a plurality of cells configured to supply power to the heater, and a battery holder separate and removable from the garment body. The battery holder is configured to receive the battery pack and connects electrically to the battery pack. The battery holder includes an electrical port that is electrically connectable with the heater supply cable. The garment body includes a compartment configured to receive the battery pack and the battery holder. The garment body also includes a closure configured for closing the compartment and opening the compartment. The heater supply cable extends into the compartment for electrically connecting with the battery holder.

20 Claims, 27 Drawing Sheets

Related U.S. Application Data continuation of application No. 14/733,503, filed on Jun. 8, 2015, now abandoned, which is a continuation of application No. 13/588,692, filed on Aug. 17, 2012, now abandoned, which is a continuation-in-part of application No. 12/940,429, filed on Nov. 5, 2010, now abandoned.

(60) Provisional application No. 61/658,662, filed on Jun. 12, 2012, provisional application No. 61/525,549, filed on Aug. 19, 2011, provisional application No. 61/258,714, filed on Nov. 6, 2009.

(58) Field of Classification Search
USPC .......................................... 219/211, 212, 217
See application file for complete search history.

(56) References Cited

U.S. PATENT DOCUMENTS

| | | | |
|---|---|---|---|
| 2,150,251 | A | 3/1939 | Shanhouse |
| 2,156,504 | A | 5/1939 | Liss |
| 2,685,021 | A | 7/1954 | Duncan |
| 2,727,241 | A | 12/1955 | Smith |
| 3,084,241 | A | 4/1963 | Carrona |
| 3,293,405 | A | 12/1966 | Costanzo |
| 3,392,264 | A | 7/1968 | Arron |
| 3,501,616 | A | 3/1970 | Arron |
| 3,663,796 | A | 5/1972 | Hines et al. |
| 3,748,436 | A | 7/1973 | Cossaboom |
| 3,953,935 | A | 5/1976 | Reiner et al. |
| 3,989,924 | A | 11/1976 | Kurtzer |
| 3,999,037 | A | 12/1976 | Metcalf, Sr. |
| 4,273,989 | A | 6/1981 | Hinton et al. |
| 4,279,255 | A | 7/1981 | Hoffman |
| 4,404,460 | A | 9/1983 | Kerr |
| 4,507,877 | A | 4/1985 | Vaccari et al. |
| 4,539,700 | A | 9/1985 | Sato |
| 4,589,134 | A | 5/1986 | Waldron |
| 4,645,325 | A | 2/1987 | Inoue et al. |
| 4,777,344 | A | 10/1988 | Nash et al. |
| 4,827,534 | A | 5/1989 | Haugen |
| 4,876,724 | A | 10/1989 | Suzuki |
| 4,985,934 | A | 1/1991 | Perry |
| 5,008,517 | A | 4/1991 | Brekkstran et al. |
| 5,032,705 | A | 7/1991 | Batchellar et al. |
| 5,101,515 | A | 4/1992 | Holt et al. |
| 5,105,067 | A | 4/1992 | Brekkstran et al. |
| 5,148,002 | A | 9/1992 | Kuo et al. |
| 5,158,039 | A | 10/1992 | Clark |
| 5,169,225 | A | 12/1992 | Palm |
| 5,230,333 | A | 7/1993 | Yates et al. |
| 5,302,806 | A | 4/1994 | Simmons et al. |
| 5,302,807 | A | 4/1994 | Zhao |
| 5,416,310 | A | 5/1995 | Little |
| 5,451,747 | A | 9/1995 | Sullivan et al. |
| 5,471,767 | A | 12/1995 | Walker |
| 5,499,401 | A | 3/1996 | Heinmiller |
| 5,603,646 | A | 2/1997 | Tobias |
| 5,605,144 | A | 2/1997 | Simmons et al. |
| 5,606,346 | A | 2/1997 | Tobias |
| 5,611,085 | A | 3/1997 | Rasmussen |
| 5,617,583 | A | 4/1997 | Yates et al. |
| 5,741,305 | A | 4/1998 | Vincent et al. |
| 5,777,296 | A | 7/1998 | Bell |
| 5,784,626 | A | 7/1998 | Odaohara |
| 5,826,273 | A | 10/1998 | Eckes |
| 5,866,881 | A | 2/1999 | Jones, III |
| 5,893,991 | A | 4/1999 | Newell |
| 5,953,758 | A | 9/1999 | Foster |
| 5,977,517 | A | 11/1999 | Grosjean |
| 6,049,062 | A | 4/2000 | Jones |
| 6,060,693 | A | 5/2000 | Brown |
| 6,078,025 | A | 6/2000 | Yeung |
| D429,058 | S | 8/2000 | Derosier |
| 6,098,612 | A | 8/2000 | Nakamoto et al. |
| 6,155,841 | A | 12/2000 | Spanyar |
| 6,168,881 | B1 | 1/2001 | Fischer et al. |
| 6,199,210 | B1 | 3/2001 | Feldman |
| 6,232,674 | B1 | 5/2001 | Frey et al. |
| 6,239,410 | B1 | 5/2001 | Tackore |
| 6,319,015 | B1 | 11/2001 | Faunce |
| 6,320,161 | B1 | 11/2001 | Hansen, Jr. |
| 6,329,638 | B1 | 12/2001 | Bloodworth |
| 6,333,570 | B1 | 12/2001 | Ilg |
| 6,342,692 | B1 | 1/2002 | Hart et al. |
| 6,350,129 | B1 | 2/2002 | Gorlick |
| 6,439,942 | B1 | 8/2002 | Pillai et al. |
| 6,450,168 | B1 | 9/2002 | Nguyen |
| 6,519,779 | B1 | 2/2003 | Taguchi |
| 6,550,471 | B2 | 4/2003 | Szymocha et al. |
| 6,558,016 | B1 | 5/2003 | Restauro |
| 6,561,814 | B2 | 5/2003 | Tilbury et al. |
| 6,563,424 | B1 | 5/2003 | Kaario |
| 6,598,235 | B2 | 7/2003 | Bulla |
| 6,649,873 | B1 | 11/2003 | Cintron, Jr. et al. |
| D487,426 | S | 3/2004 | Johnson |
| 6,792,124 | B2 | 9/2004 | Tilbury et al. |
| D498,037 | S | 11/2004 | Bay |
| 6,826,782 | B2 | 12/2004 | Jordan |
| 6,854,988 | B2 | 2/2005 | Marmaropoulos et al. |
| 6,888,111 | B1 | 5/2005 | Tobin |
| 6,963,055 | B2 | 11/2005 | Rock et al. |
| 7,210,939 | B2 | 5/2007 | Marmaropou et al. |
| 7,230,206 | B1 | 6/2007 | Randall |
| 7,375,308 | B2 | 5/2008 | Ferguson |
| 7,448,874 | B2 | 11/2008 | Willis |
| 7,462,035 | B2 | 12/2008 | Lee et al. |
| RE40,613 | E | 1/2009 | Jordan |
| 7,476,104 | B2 | 1/2009 | Marmaropoulos et al. |
| 7,496,969 | B2 | 3/2009 | Pieczynski |
| 7,559,768 | B2 | 7/2009 | Marmaropoulos et al. |
| 7,560,664 | B2 | 7/2009 | Ford et al. |
| 7,618,260 | B2 | 11/2009 | Daniel et al. |
| 7,624,453 | B2 | 12/2009 | Rene et al. |
| 7,651,016 | B2 | 1/2010 | Stewart |
| 7,731,517 | B2 | 6/2010 | Lee et al. |
| 7,739,748 | B2 | 6/2010 | Nilforushan et al. |
| 7,753,685 | B2 | 7/2010 | Lee et al. |
| 7,816,628 | B2 | 10/2010 | Fernandez et al. |
| 7,816,632 | B2 | 10/2010 | Bourke, III et al. |
| D631,393 | S | 2/2011 | Shani et al. |
| 7,886,368 | B2 | 2/2011 | Hood |
| 7,959,351 | B1 | 6/2011 | Thorpe |
| 7,966,667 | B2 | 6/2011 | Tomlinson et al. |
| 7,994,752 | B2 | 8/2011 | Soar |
| 8,062,797 | B2 | 11/2011 | Fisher et al. |
| 8,105,371 | B1 | 1/2012 | Giocondo, Jr. |
| 8,107,653 | B2 | 1/2012 | Wolfe |
| 8,144,911 | B2 | 3/2012 | Chiang et al. |
| 8,157,570 | B2 | 4/2012 | Chen |
| 8,251,157 | B2 | 8/2012 | Gray et al. |
| D669,500 | S | 10/2012 | Dangerfield |
| 8,564,249 | B2 | 10/2013 | Lundqvist et al. |
| D729,690 | S | 5/2015 | Rivirere |
| D766,844 | S | 9/2016 | Turksu et al. |
| D808,616 | S | 1/2018 | Dorman |
| D842,819 | S | 3/2019 | Maetani et al. |
| D866,487 | S | 11/2019 | Dorman |
| 11,033,059 | B2 | 6/2021 | Janda et al. |
| 11,350,491 | B2 * | 5/2022 | Gray ................. A41D 13/0051 |
| D962,876 | S | 9/2022 | Altonen et al. |
| D986,187 | S | 5/2023 | Altonen et al. |
| D988,291 | S | 6/2023 | Ebersole |
| 2001/0047992 | A1 | 12/2001 | Deangelis et al. |
| 2002/0076949 | A1 | 6/2002 | Tilbury et al. |
| 2003/0074712 | A1 | 4/2003 | Liao |
| 2004/0069761 | A1 | 4/2004 | Carr et al. |
| 2004/0070996 | A1 | 4/2004 | Carr |
| 2004/0237169 | A1 | 12/2004 | Wood et al. |
| 2004/0256381 | A1 | 12/2004 | Haas et al. |
| 2004/0257038 | A1 | 12/2004 | Johnson et al. |
| 2005/0007406 | A1 | 1/2005 | Haas et al. |
| 2005/0246826 | A1 | 11/2005 | McCarter et al. |

(56) References Cited

U.S. PATENT DOCUMENTS

| | | | |
|---|---|---|---|
| 2006/0001727 | A1 | 1/2006 | Haas et al. |
| 2006/0060576 | A1 | 3/2006 | Haas et al. |
| 2006/0128169 | A1 | 6/2006 | Marmaropoulos et al. |
| 2006/0166520 | A1 | 7/2006 | Marmaropoulos et al. |
| 2006/0213895 | A1 | 9/2006 | Dennis |
| 2006/0227675 | A1 | 10/2006 | Fried |
| 2007/0045269 | A1 | 3/2007 | Vassallo |
| 2007/0118960 | A1 | 5/2007 | Goodwin |
| 2007/0151593 | A1 | 7/2007 | Jaynes |
| 2007/0287035 | A1 | 12/2007 | Marmaropoulos et al. |
| 2008/0005825 | A1 | 1/2008 | Tronvold |
| 2008/0023460 | A1 | 1/2008 | Huang |
| 2008/0024438 | A1 | 1/2008 | Collins et al. |
| 2008/0067163 | A1 | 3/2008 | Axinte et al. |
| 2008/0083740 | A1 | 4/2008 | Kaiserman et al. |
| 2008/0184459 | A1 | 8/2008 | Barnes |
| 2008/0223844 | A1 | 9/2008 | Cronn |
| 2009/0014436 | A1 | 1/2009 | Toya et al. |
| 2009/0032520 | A1 | 2/2009 | Cronn |
| 2009/0094725 | A1 | 4/2009 | Smith et al. |
| 2009/0158493 | A1 | 6/2009 | Kim |
| 2009/0178173 | A1 | 7/2009 | Schultz |
| 2009/0217440 | A1 | 9/2009 | Sutker |
| 2009/0230112 | A1 | 9/2009 | Ducharme et al. |
| 2009/0289046 | A1 | 11/2009 | Richmond |
| 2009/0310290 | A1 | 12/2009 | Tennent |
| 2010/0031424 | A1 | 2/2010 | Sharpe et al. |
| 2010/0100997 | A1 | 4/2010 | Lee et al. |
| 2010/0115684 | A1 | 5/2010 | Freedman et al. |
| 2010/0198043 | A1 | 8/2010 | Holzer et al. |
| 2010/0263603 | A1 | 10/2010 | Baron |
| 2010/0283295 | A1 | 11/2010 | Smith et al. |
| 2010/0299800 | A1 | 12/2010 | Jackson |
| 2011/0012552 | A1 | 1/2011 | Margalit |
| 2011/0108538 | A1 | 5/2011 | Gray et al. |
| 2011/0173731 | A1 | 7/2011 | McElroy et al. |
| 2011/0185469 | A1 | 8/2011 | Santuccio et al. |
| 2011/0260556 | A1 | 10/2011 | Partridge et al. |
| 2011/0306218 | A1 | 12/2011 | Chen |
| 2012/0060260 | A1 | 3/2012 | Kochling |
| 2012/0062571 | A1 | 3/2012 | Malek |
| 2012/0074128 | A1 | 3/2012 | Blackford et al. |
| 2012/0091115 | A1 | 4/2012 | Mironichev et al. |
| 2012/0298493 | A1 | 11/2012 | Hogan et al. |
| 2013/0037531 | A1 | 2/2013 | Gray et al. |
| 2013/0227757 | A1 | 9/2013 | Chen |
| 2013/0334194 | A1 | 12/2013 | Chen |
| 2014/0246416 | A1 | 9/2014 | White |
| 2015/0060430 | A1 | 3/2015 | Tsuge et al. |
| 2015/0271873 | A1 | 9/2015 | Gray et al. |
| 2017/0013889 | A1 | 1/2017 | Chen |

FOREIGN PATENT DOCUMENTS

| | | | |
|---|---|---|---|
| DE | 20012530 | U1 | 11/2000 |
| FR | 2793116 | A1 | 11/2000 |
| GB | 2158693 | A | 11/1985 |
| JP | 6251757 | A | 9/1994 |
| JP | 2000064112 | A | 2/2000 |
| WO | 2012034416 | A1 | 3/2012 |

OTHER PUBLICATIONS

Milwaukee Electric Tool, "M12™ Heated Jacket (Jacket Only), " <https://www.milwaukeetool.com/Products/Work-Gear/Heated-Gear/Heated-Jackets/2390> web page visited Jun. 6, 2023 (3 pages).

Milwaukee Electric Tool, "Women's Large M12 12-Volt Lithium-Ion Cordless AXIS Black Heated Quilted Jacket Kit with One 3.0 Ah Battery and Charger," <https://www.homedepot.com/p/Milwaukee-Women-s-Large-M12-12-Volt-Lithium-Ion-Cordless-AXIS-Black-Heated-Quilted-Jacket-Kit-with-One-3-0-Ah-Battery-and-Charger-234B-212X/321401962> web page visited Jun. 6, 2023 (6 pages).

Ptahdus, "Ptahdus Women's Heated Jacked with Battery Pack 7.4V, with Hand Warmer Pocket," <https://www.amazon.com/PTAHDUS-Womens-Battery-XX-Large-Amaranth/dp/B089QMK4NJ/ref=asc_df_B089QMK4NJ/?tag=hyprod-20&linkCode=%E2%80%A6> web page visited Jun. 6, 2023 (11 pages).

"Convertible Heated Soft-shell Jacket," http://www.plusheat.com/by-brand/convertible-heated-soft-shell-jacket.html, pp. 1-20, 2010.

Heated Electric Jacket Battery 12V Compatible, http://www.electricblanket.net/p-96-heated-electric-jacket-battery-12-volt-compatable.aspx, pp. 1-4, 1999.

Series and Parallel Battery Configurations and Information, <https://batteryuniversity.com/index.php/learn/article/serial_and_parallel_battery_configurations>, Jun. 18, 2019 (4 pages).

Schmidt et al., "Modeling the Impact of Manufacturing Uncertainties on Lithium-Ion Batteries," Journal of The Electrochemical Society, 2020, vol. 167, 15 pages.

* cited by examiner

ELECTRICALLY HEATED GARMENT

CROSS-REFERENCE TO RELATED APPLICATION

This application is a continuation of U.S. patent application Ser. No. 15/875,768, filed Jan. 19, 2018, now U.S. Pat. No. 11,350,491, which is a continuation of U.S. patent application Ser. No. 14/733,503, filed Jun. 8, 2015, now abandoned, which is a continuation of U.S. patent application Ser. No. 13/588,692, filed Aug. 17, 2012, now abandoned, which claims priority to U.S. Provisional Patent Application No. 61/525,549, filed Aug. 19, 2011, and to U.S. Provisional Patent Application No. 61/658,662, filed Jun. 12, 2012, and which is a continuation-in-part of U.S. patent application Ser. No. 12/940,429, filed Nov. 5, 2010, now abandoned, which claims priority to U.S. Provisional Patent Application No. 61/258,714, filed Nov. 6, 2009. The entire contents of these applications are incorporated herein by reference.

BACKGROUND OF INVENTION

The present invention relates to garments, and in particular, to an electrically heated jacket for providing heat to a user wearing the jacket.

Garments, especially outwear such as jackets and parkas, may be insulated to protect a user from the cold. Insulated jackets rely on the user's own body heat to keep the user warm. If the insulation is too thin, the user may be cold. If the insulation is too thick, the user may overheat.

SUMMARY OF THE INVENTION

In one aspect, the disclosure provides article of clothing including a garment body having an inner surface configured to rest against a user's body when worn and an outer surface opposite the inner surface. A heating system is coupled to the garment body. The heating system includes a heater configured to heat the garment body and a heater supply cable for providing electrical power to the heater. A battery pack includes a plurality of cells for supplying power to the heating system. A battery holder is separate and removable from the garment body. The battery holder is configured to receive the battery pack and configured to connect electrically to the battery pack. The battery holder includes an electrical port that is selectively electrically connectable with the heater supply cable. The electrical port is configured to provide electrical power from the battery pack to the heating system. The garment body includes a compartment configured to hold the battery pack and the battery holder. The garment body also includes a closure configured for closing the compartment and opening the compartment to provide selective access to the battery pack and the battery holder such that the battery pack and the battery holder are removable from the compartment. The heater supply cable extends into the compartment to electrically connect with the battery holder while the compartment is closed. The battery holder is removable from the compartment when the heater supply cable is disconnected from the electrical port.

In another aspect, the disclosure provides an article of clothing including a garment body having an inner surface configured to rest against a user's body when worn and an outer surface opposite the inner surface. The article of clothing also includes a heater coupled to the garment body, a heater supply cable in electrical communication with the heater, a battery pack including a plurality of cells for supplying power to the heater, and a battery holder separate and removable from the garment body. The battery holder is configured to detachably latch to the battery pack and configured to connect electrically to the battery pack. The battery holder includes an electrical port that is selectively electrically connectable with the heater supply cable for providing electrical power from the battery pack to the heater. The garment body includes a compartment configured to hold the battery pack and the battery holder. The garment body also includes a closure configured for closing the compartment and opening the compartment. The heater supply cable extends from the garment body into the compartment to electrically connect to the battery holder while the compartment is closed. The battery holder is removable from the compartment when the heater supply cable is disconnected from the electrical port.

In another aspect, the disclosure provides an article of clothing including a garment body, a heater coupled to the garment body, a heater supply cable in electrical communication with the heater, a battery pack including a plurality of cells configured to supply power to the heater, and a battery holder separate and removable from the garment body. The battery holder is configured to receive the battery pack and configured to connect electrically to the battery pack. The battery holder includes an electrical port that is electrically connectable with the heater supply cable. The garment body includes a compartment configured to receive the battery pack and the battery holder. The garment body also includes a closure configured for closing the compartment and opening the compartment. The heater supply cable extends into the compartment for electrically connecting with the battery holder.

Other aspects of the disclosure will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

Figure 1:
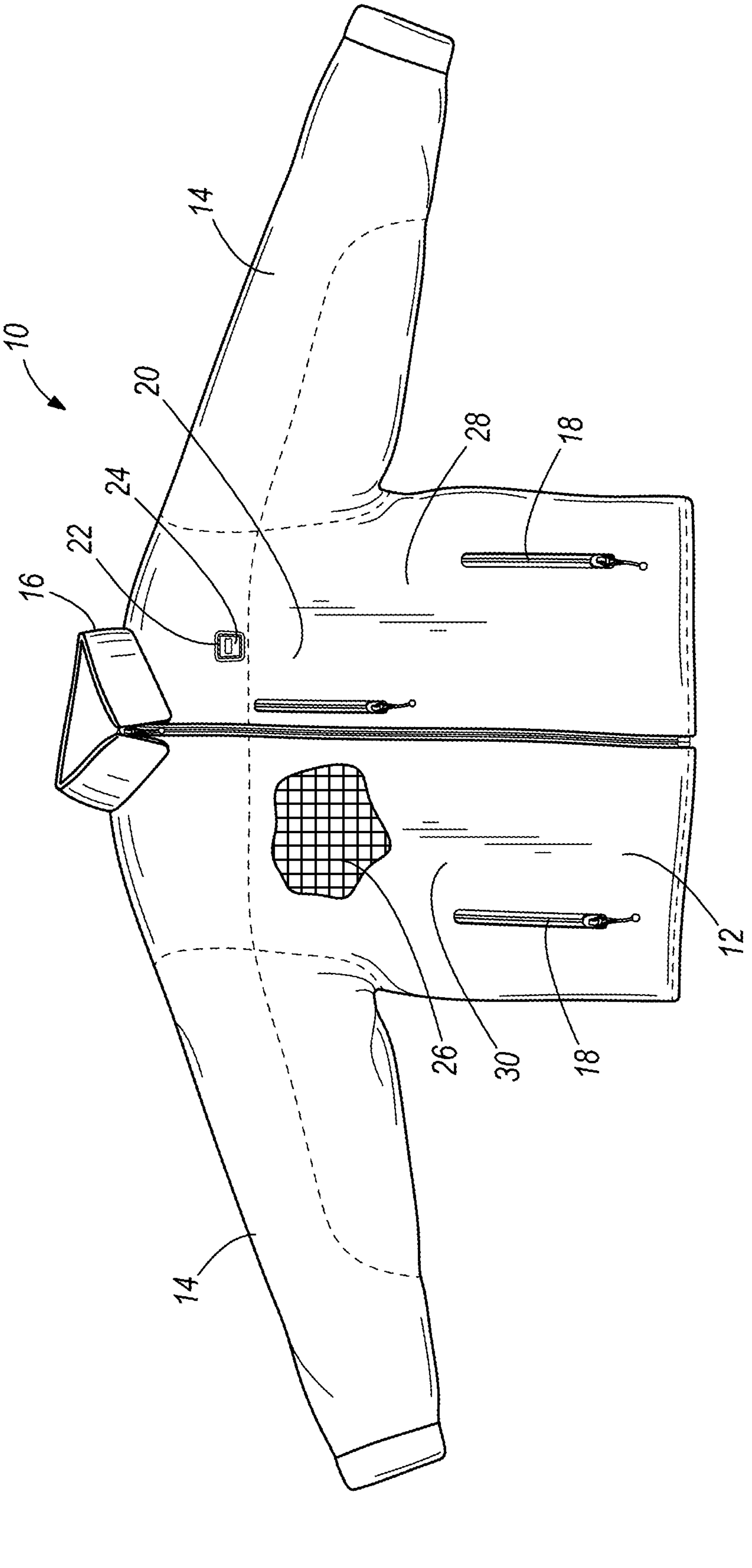
FIG. 1 is a front view of a jacket according to one embodiment of the invention.

FIG. 1 illustrates a heated jacket 10 according to one embodiment of the invention. The jacket 10 may be constructed in various sizes to fit a variety of users. The jacket 10 includes typical jacket features such as a torso body 12, arms 14, a collar 16, and front pockets 18. A front surface 20 of the jacket 10 includes a control input. In the illustrated embodiment, the control input is a button 22 that may be actuated by user. As explained in greater detail below, the button 22 includes a display portion 24 to indicate a status of the heated jacket 10.

Figure 2:
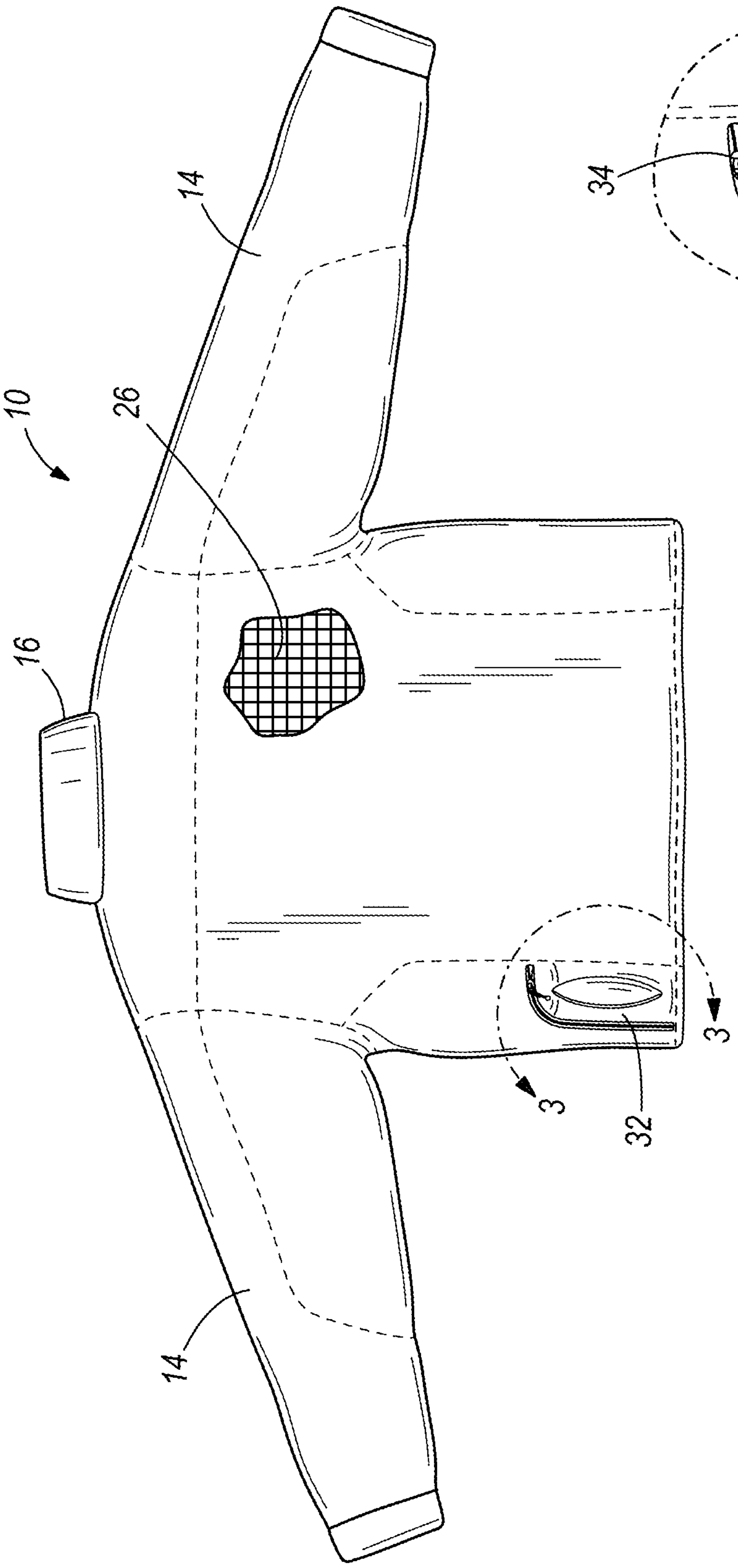
FIG. 2 is a rear view of the jacket of FIG. 1.

As illustrated in cutaway portions of FIGS. 1 and 2, the jacket 10 includes a heater array 26. The heater array 26 is disposed in both a left portion 28 and a right portion 30 of the torso body 12. In some embodiments, the heater array 26 may extend into the arms 14 and/or collar 16. In other embodiments the jacket may include a first heater array and second heater array arranged as an upper module and a lower module, respectively. In the illustrated embodiment, the heater array 26 is controlled via the button 22 shown in FIG. 1. In other embodiments, multiple heater arrays may be controlled individually via a single control input or multiple control inputs. The heating array 26 may include resistive heating coils formed of carbon fibers, high density carbon fibers, or other heating devices. The heated jacket 10 is capable of maintaining a temperature of up to 110 degrees Fahrenheit, although in further embodiments lower or greater temperatures are possible depending upon the heat source.

Figure 3:
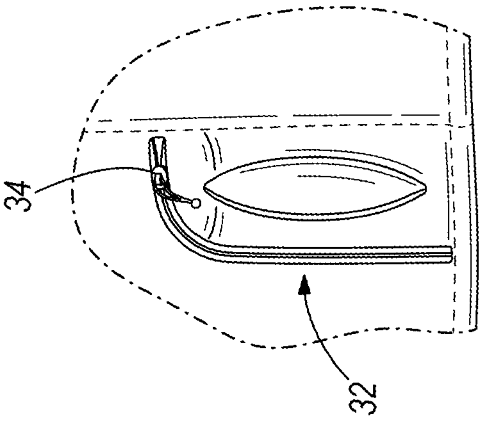
FIG. 3 is a detailed view of a rear compartment of the jacket of FIG. 2, and taken along line 3-3 of FIG. 2.
Figure 4:
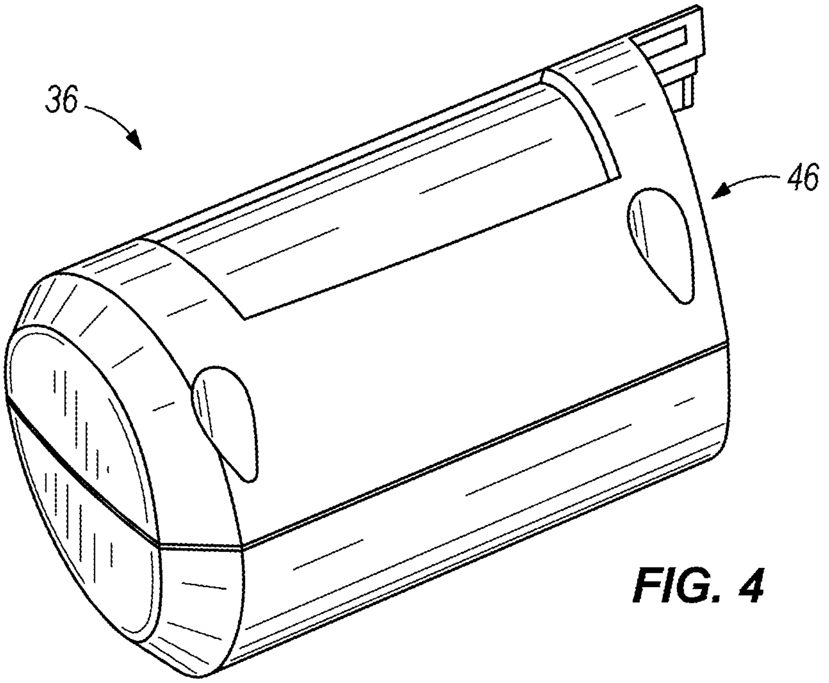
FIG. 4 is a perspective view of a battery holder according to one embodiment of the invention.

As illustrated in FIG. 2, the heated jacket 10 includes a compartment 32 located on a lower portion of the back torso body. The compartment 32 houses an electrical component, such as a battery pack and battery holder. As illustrated in FIG. 3, the compartment 32 includes a zipper 34, providing selective access by a user to the compartment 32 in order to access the battery pack and other electrical components. FIG. 4 illustrates one example of a battery holder 36. The battery holder 36 is configured to receive a battery pack 38, such as the battery pack illustrated in FIG. 5.

Figure 5:
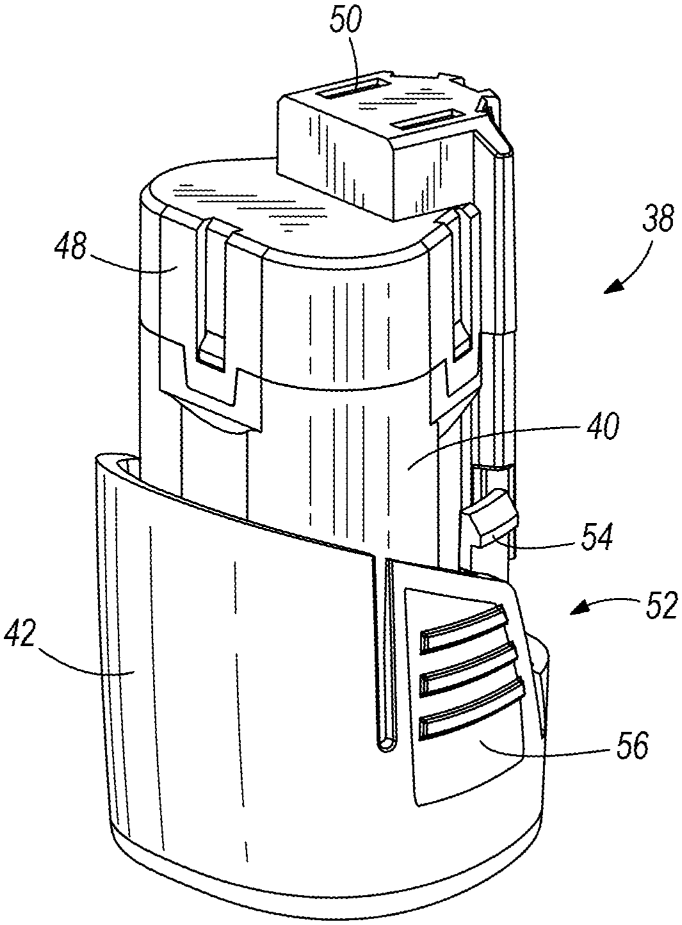
FIG. 5 is a perspective view of a battery pack for use with the battery holder of FIG. 4.
Figure 13:
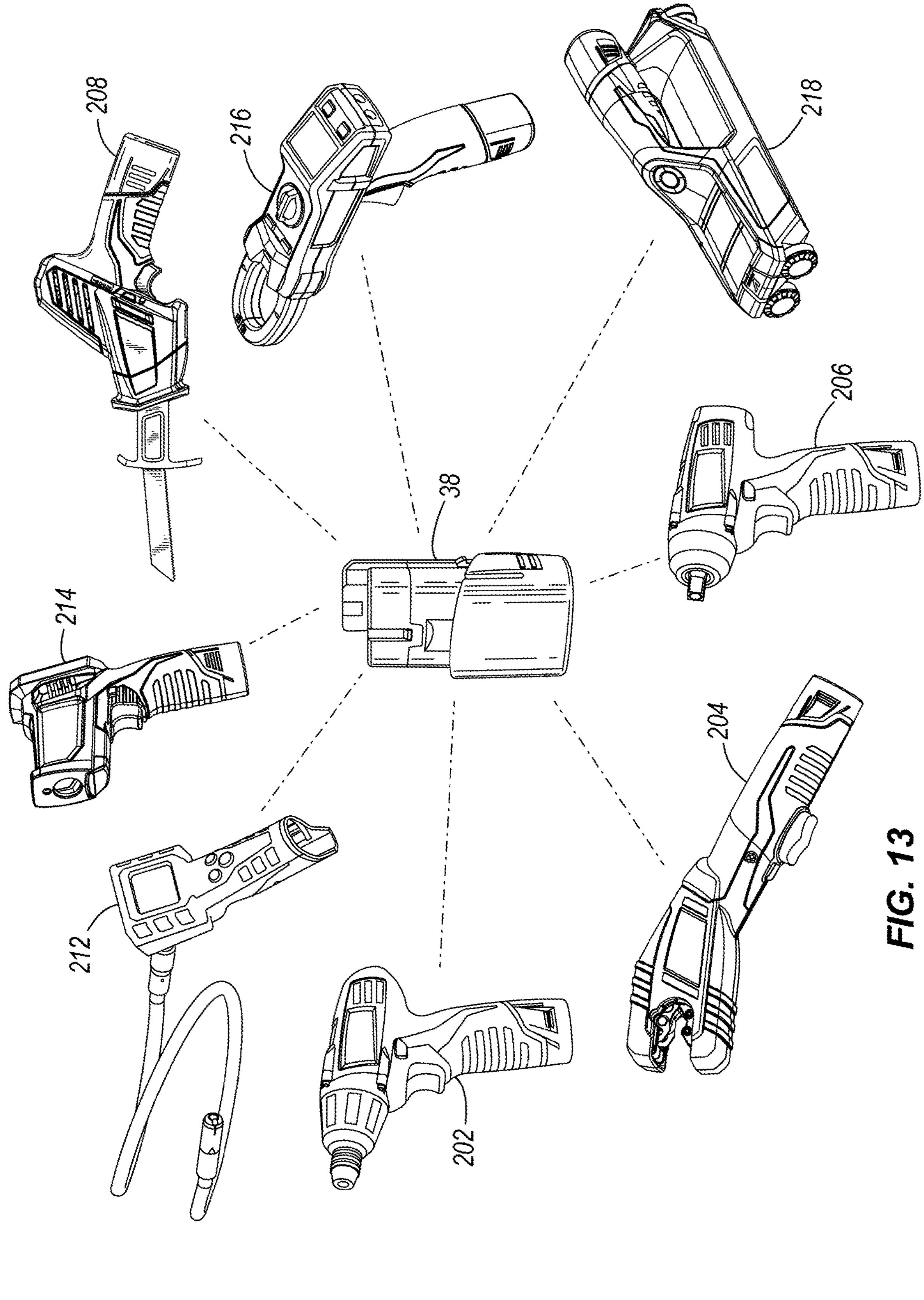
FIG. 13 is a perspective view of tools and devices usable with the battery pack of FIG. 5.

Referring to FIG. 5, the battery pack 38 is a lithium-based, rechargeable battery pack. The battery pack 38 is removably and interchangeably connected to the battery holder 36 to provide power to the jacket 10 during operation and to facilitate recharging of the battery pack 38 when not in use. In some embodiments, the battery pack 38 may be used with other types of cordless, battery-powered tools or devices. FIG. 13, discussed below, illustrates exemplary tools and devices with which the battery pack 38 may be used. The battery pack 38 also may be used with other power tools or sensing devices not specifically discussed herein.

Figure 6:
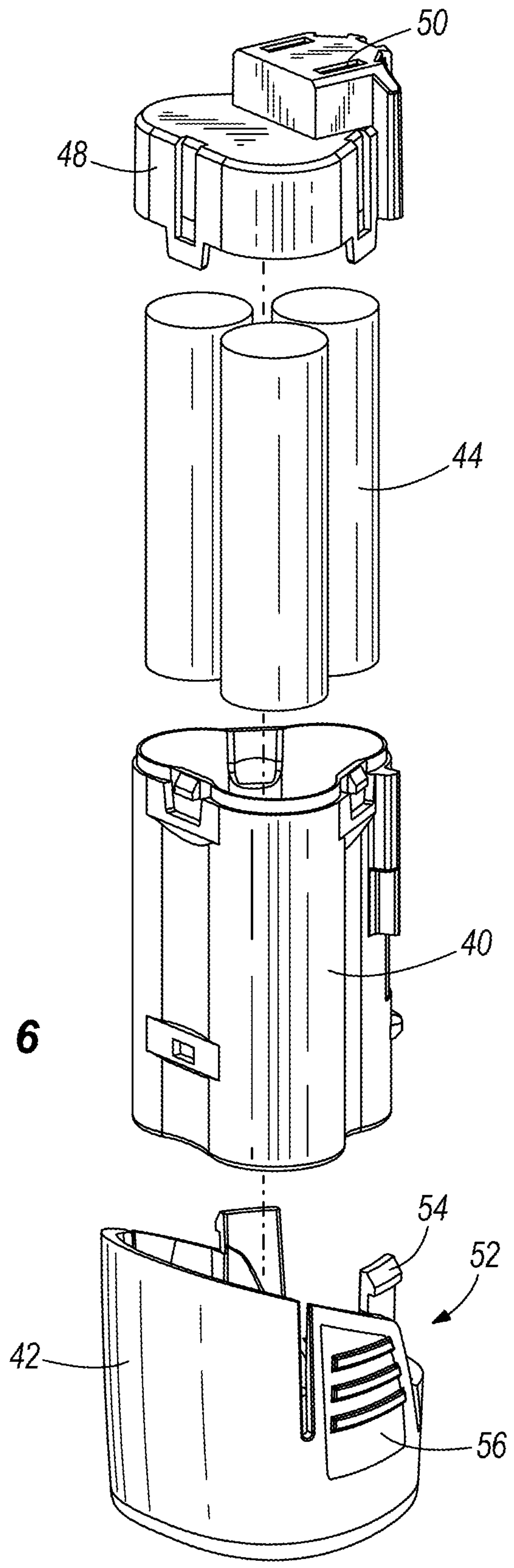
FIG. 6 is an exploded view of the battery pack of FIG. 5.

As illustrated in FIGS. 5 and 6, the battery pack 38 includes a casing 40, an outer housing 42 coupled to the casing 40, and a plurality of battery cells 44 positioned within the casing 40. The casing 40 is shaped and sized to fit within a cavity 46 of the battery holder 36 illustrated in FIG. 4, or alternatively, in a power tool or non-motorized sensing device to connect the battery pack 38 to the tool or device. The casing 40 includes an end cap 48 to substantially enclose the battery cells 44 within the casing 40. The illustrated end cap 48 includes two power terminals 50 configured to mate with corresponding power terminals 60 (FIG. 7) extending within the cavity 46 of the battery holder 36. In other embodiments, the end cap 48 may also include sense or communication terminals that are configured to mate with corresponding terminals within the battery holder or a tool. The outer housing 42 includes a latching arrangement 52 for positively engaging the battery pack 38 with the battery holder 36. The latching arrangement 52 includes latching tabs 54 and resilient actuating portions 56. The latching tabs 54 are configured to engage corresponding recesses within the cavity 46 of the battery holder 36. The resilient actuating portions 56 are coupled to the latching tabs 54 and are configured for a user to selectively disengage the latching tabs 54 from the battery holder 36.

As shown in FIG. 6, the battery pack 38 includes three battery cells 44 positioned within the casing 40 and electrically coupled to the terminals 50. The battery cells provide operational power (e.g., DC power) to the jacket 10 or other device. In the illustrated embodiment, the battery cells 44 are arranged in series, and each battery cell has a nominal voltage of approximately four-volts (4.0V), such that the battery pack 38 has a nominal voltage of approximately twelve-volts (12V). The cells 44 also have a capacity rating of approximately 1.4 Ah. In other embodiments, the battery pack 38 may include more or fewer battery cells 44, and the cells 44 can be arranged in series, parallel, or a serial and parallel combination. For example, the battery pack 38 can include a total of six battery cells in a parallel arrangement of two sets of three series-connected cells. The series-parallel combination of battery cells creates a battery pack having a nominal voltage of approximately 12V and a capacity rating of approximately 2.8 Ah. In other embodiments, the battery cells 44 may have different nominal voltages, such as, for example, 3.6V, 3.8V, 4.2V, etc., and/or may have different capacity ratings, such as, for example, 1.2 Ah, 1.3 Ah, 2.0 Ah, 2.4 Ah, 2.6 Ah, 3.0 Ah, etc. In other embodiments, the battery pack 38 can have a different nominal voltage, such as, for example, 10.8V, 14.4V, etc. In the illustrated embodiment, the battery cells 44 are lithium-ion battery cells having a chemistry of, for example, lithium-cobalt (Li—Co), lithium-manganese (Li—Mn), or Li—Mn spinel. In other embodiments, the battery cells 44 may have other suitable lithium or lithium-based chemistries.

Figure 7:
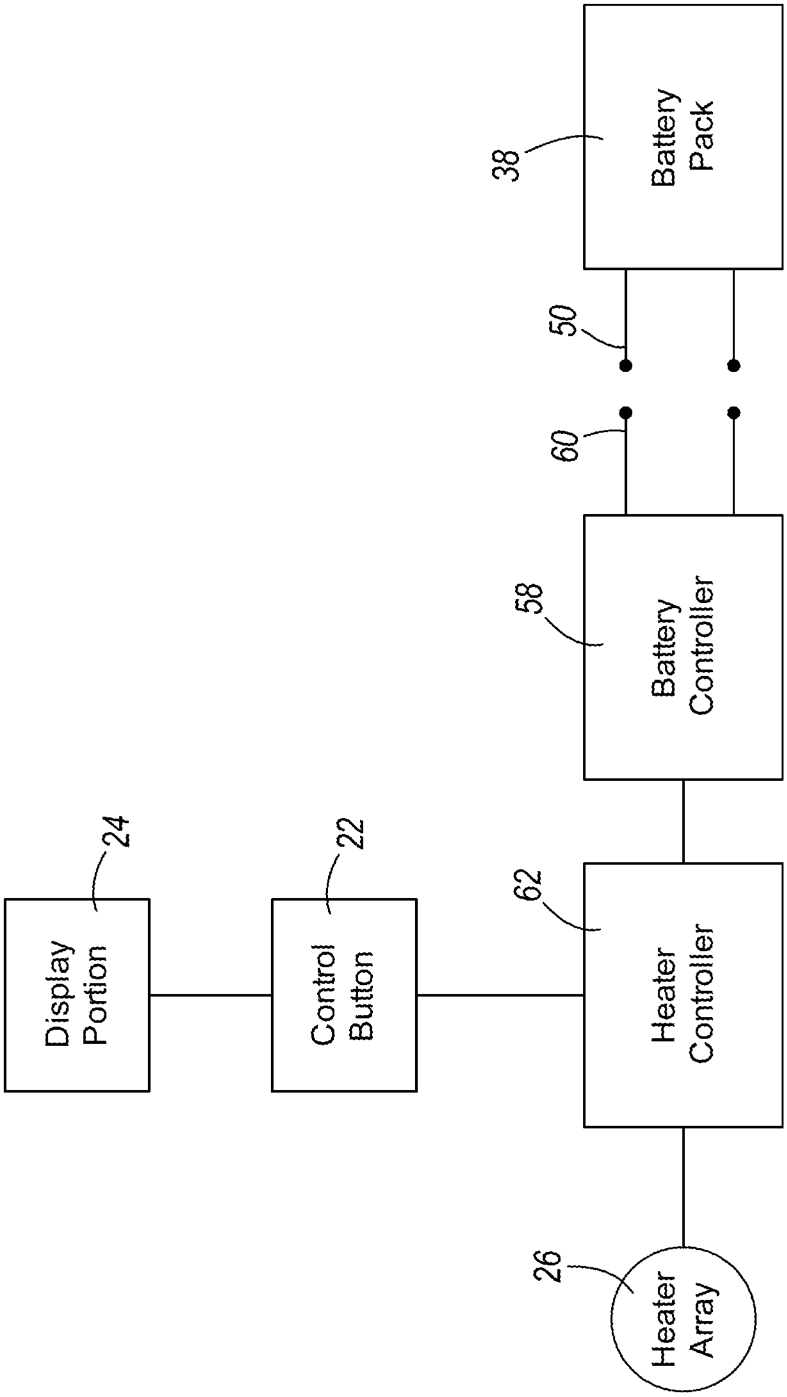
FIG. 7 is an electrical block diagram for the jacket of FIG. 1.

The heated jacket 10 includes control circuitry for the heater array 26 and battery pack 38. FIG. 7 is a block diagram of the heated jacket 10. A battery controller 58 receives electricity from the battery pack 38 via battery terminals 60 (disposed within the battery holder 36). The battery controller 58 may be configured to monitor a state of charge of the battery pack 38 and, if necessary, shutdown the heater array 26.

A heater controller 62 receives inputs from the control button 22 and selectively powers the heater array 26 depending upon the selected thermal output. The display portion 24 is selectively illuminated based upon the selected thermal output setting. The heater controller 62 may be configured to monitor a plurality of conditions of the jacket 10 including, but not limited to, an amount of current drawn by the heater array 26. The controllers 58, 62 are, for example, microprocessors, microcontrollers, or the like, and are configured to communicate with one another. In the illustrated embodiment, the battery controller 58 provides information to the heater controller 62 related to a battery pack temperature or voltage level. The heater controller 62 and the battery controller 58 also include low voltage monitors and state-of-charge monitors. The monitors are used to determine whether the battery pack 38 is experiencing a low voltage condition, which may prevent proper operation of the heater array 26, or if the battery pack 38 is in a state-of-charge that makes the battery pack 38 susceptible to being damaged. If such a low voltage condition or state-of-charge exists, the heater array 26 is shut down or the battery pack 38 is otherwise prevented from further discharging current to prevent the battery pack from becoming further depleted.

The heated jacket 10 illustrated in FIGS. 1 and 2 may be operated as follows. To turn on the heated jacket 10, a user presses and holds the control button 22 for a first period (e.g., three seconds). When first turned on, the heater controller 62 causes the heated jacket 10 to enter pre-heat mode. The heated jacket 10 remains in a pre-heat mode for a period (e.g., five minutes) and then the heater controller 62 switches the heater array 26 to a medium thermal output setting. The user may adjust the thermal output setting by actuating the control button 22. Each press of the control button 22 will cycle the heater controller 62 through one of a sequence of thermal output settings (e.g., low, medium, high). In order to turn off the heated jacket 10 (or de-energize the heater array 26), the user presses and holds the control button 22 for a third period (e.g., three seconds).

As mentioned previously, the control button 22 includes an illuminated display portion 24 to indicate a status of the heaters. The display portion may be, for example, one or more LEDs. In the pre-heat mode, the display portion 24 flashes red. At a low thermal output setting, the display portion 24 glows blue. At a medium thermal output setting, the display portion 24 glows white. At a high thermal output setting, the display portion glows red. Other embodiments may use various other colors or light patterns to indicate thermal output settings. Still other embodiments may indicate a state of charge of the battery pack 38.

Figure 8:
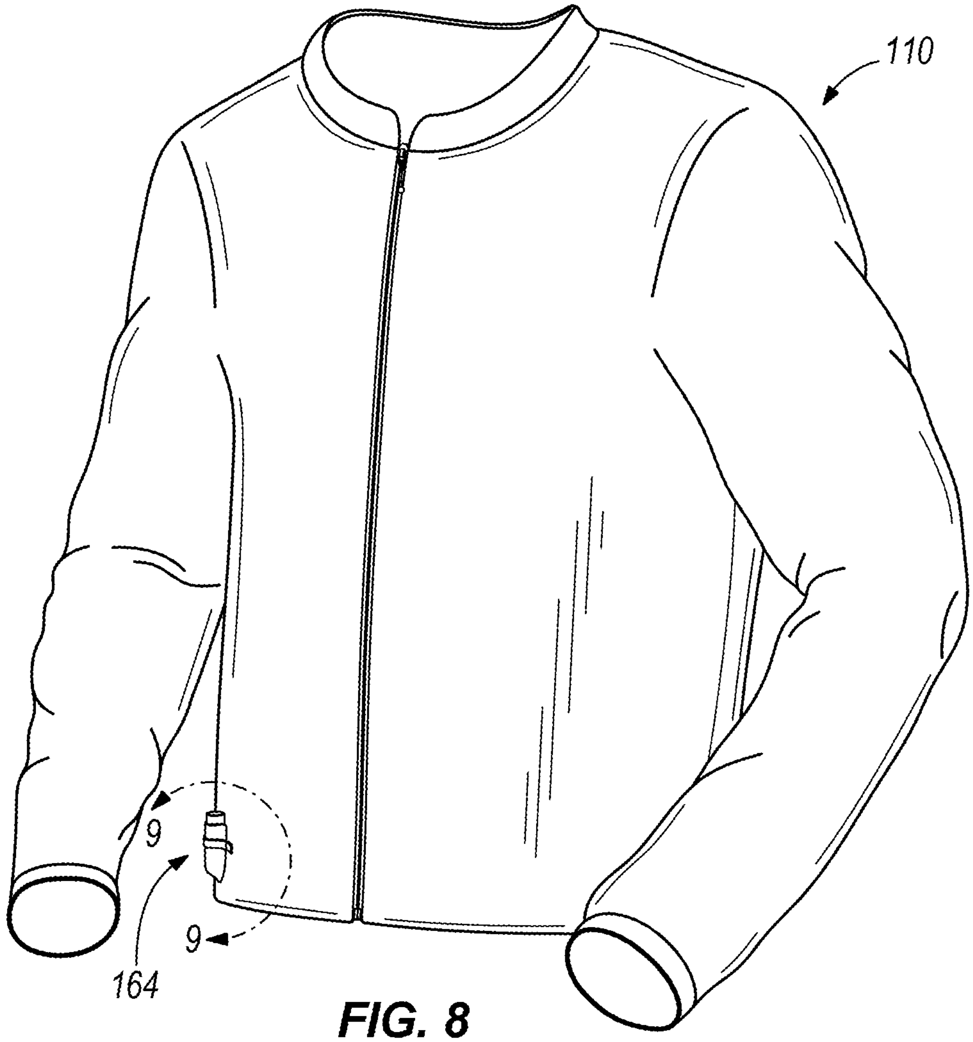
FIG. 8 is an image of a heated jacket including a heating module according to another embodiment of the invention.
Figure 9:
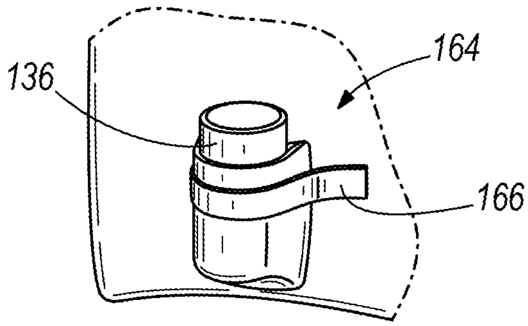
FIG. 9 is an enlarged view of the heated jacket including the heating module of FIG. 8.

FIG. 8 illustrates a heated jacket 110 according to another embodiment of the invention. The heated jacket 110 may be constructed in various sizes to fit a variety of users. FIG. 9 is an enlarged view of a heating module 164, which is coupled to an outside surface of the jacket 110 by way of a strap 166. Alternatively, the heating module 164 may be coupled to an inner surface of the jacket 110 or disposed inside of an inner pocket of the jacket 110.

The heating module 164 includes a battery pack holder 136 (FIGS. 10 and 11) and a battery pack 38 (FIG. 5). The heating module 164 is electrically coupled to one or more heating coils (not shown) positioned within the jacket 110 to heat the jacket and provide heat to a user wearing the jacket. In the illustrated embodiment, multiple heating coils are employed and positioned in various locations, or zones, within the jacket. For example, separate heating coils may be positioned in an upper torso area and a lower torso area, and may be separately controllable by the user. In further embodiments, a single heating coil may be used, or the heating coils may be positioned at other locations within the jacket, (e.g., the back, arms, etc.).

Figure 10:
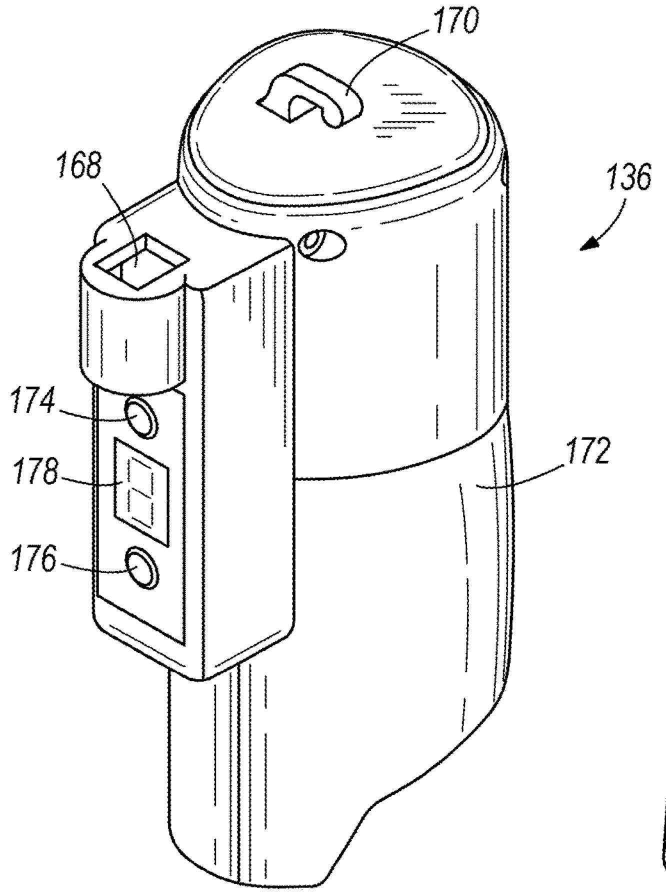
FIG. 10 is a top perspective view of a portion the heating module of FIG. 8.
Figure 11:
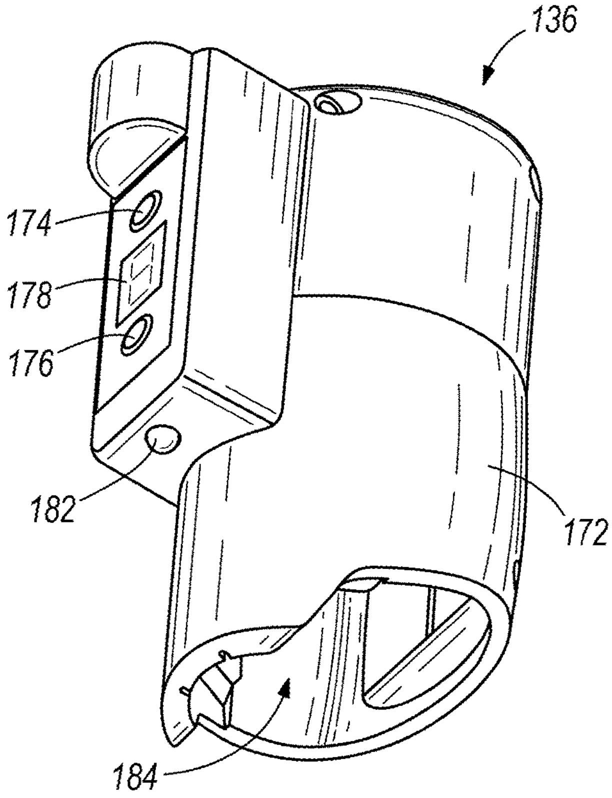
FIG. 11 is a bottom perspective view of the portion of the heating module of FIG. 10.

FIGS. 10 and 11 illustrate the battery holder 136 of the heating module 164 in greater detail. With reference to FIG. 11, the battery holder 136 includes an aperture 168 for receiving an end of a cord (not shown), the cord being connected to the one or more heating coils and including a male connector terminal. A female connector (not shown) is positioned within the battery holder 136 adjacent the aperture 168 to receive the male connector and form an electrical connection between the heating coils and the battery pack 38. The battery holder 136 also includes a hook 170 for securing the cord disposed between the connector and the jacket 110.

Figure 12:
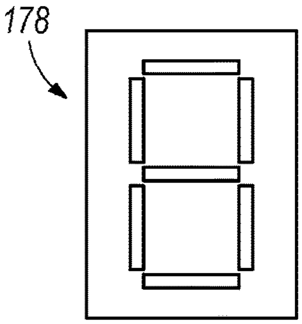
FIG. 12 is a front view of a display for positioning in an aperture of the heating module of FIG. 10.

With further reference to FIG. 10, the battery holder 136 includes a housing portion 172 for electrical components, including a circuit board (not shown). The housing portion 172 includes a first button 174, a second button 176 and a display 178. The first button 174 and the second button 176 are capable of communicating with the electrical components. In the illustrated embodiment, the first button 174 is pressed by a user to increase the temperature of the heating coils, and the second button 176 is pressed by a user for lowering the temperature of the heating coils. In the illustrated embodiment of FIG. 12, the display 178 is a seven segment display for representing a heating level indicative of the temperature of the heating coils.

With reference to FIG. 11, the battery holder 136 includes a power indicator 182, such as a light emitting diode (LED) that displays to the user when lit that the battery is connected, the heating coils are on, or the like. A portion of the battery holder 136 defines a battery cavity 184 for receiving the battery pack 38 (FIG. 5).

In other embodiments, the battery holder 136 includes an on/off switch (such as the control button 22 discussed above), a fuel gauge that displays the amount of battery power remaining, and a user interface including heat zone controls to individually control the heating coils if multiple heating coils are employed.

FIG. 13 illustrates exemplary power tools and sensing devices with which the battery pack 38 may be usable. The battery pack 38 may be usable with power tools such as a drill 202, a pipe cutter 204, an impact driver 206, and a reciprocating saw 208. The battery pack 38 may also be usable with non-motorized sensing devices such as a visual inspection camera 212, an infrared sensor 214 (such as a thermometer or thermal imaging camera), a clamp-type multimeter 216, and a wall scanner 218 (such as a "stud finder").

Figure 14:
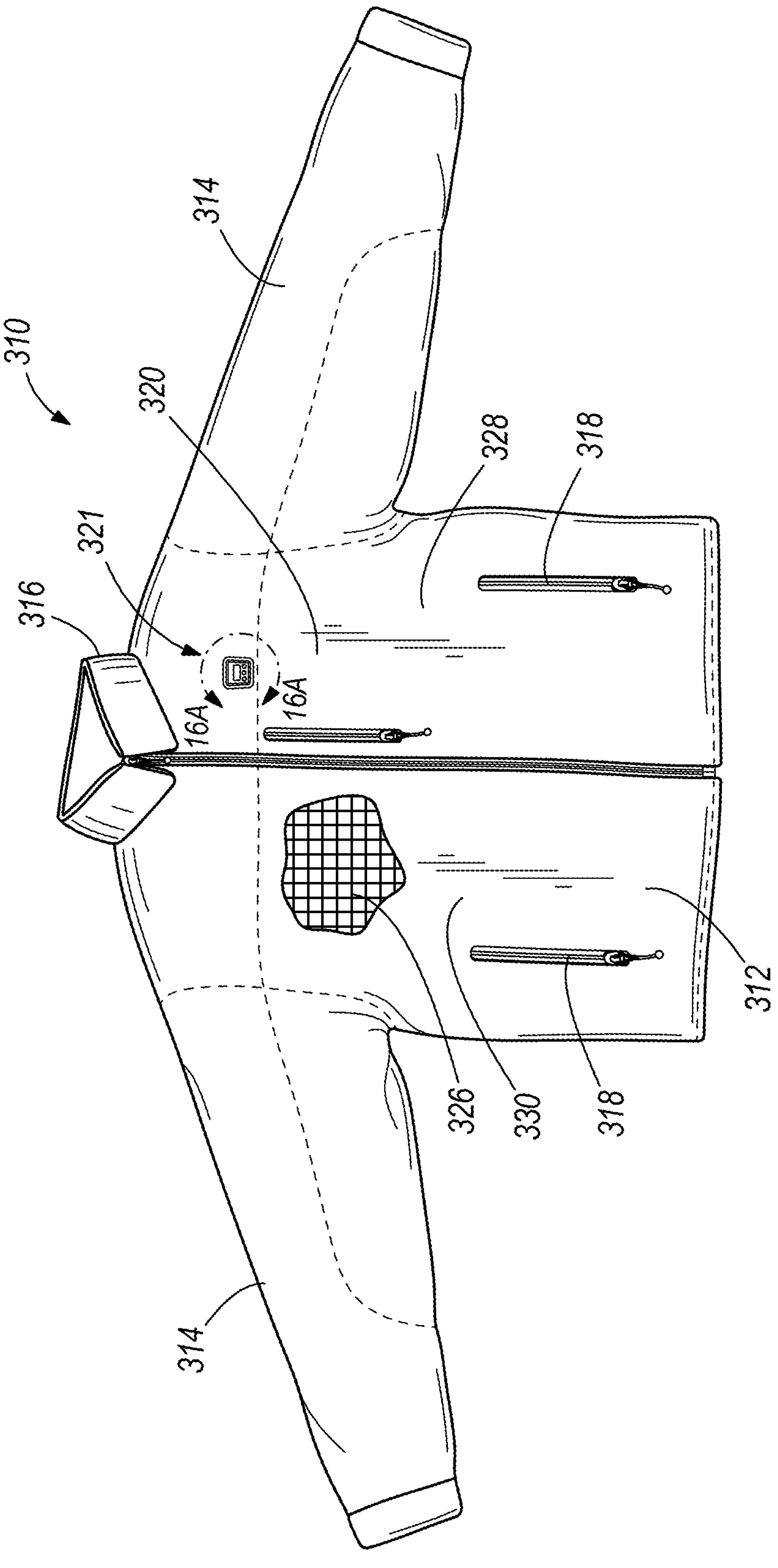
FIG. 14 is a front view of a jacket according to one embodiment of the invention.
Figure 15:
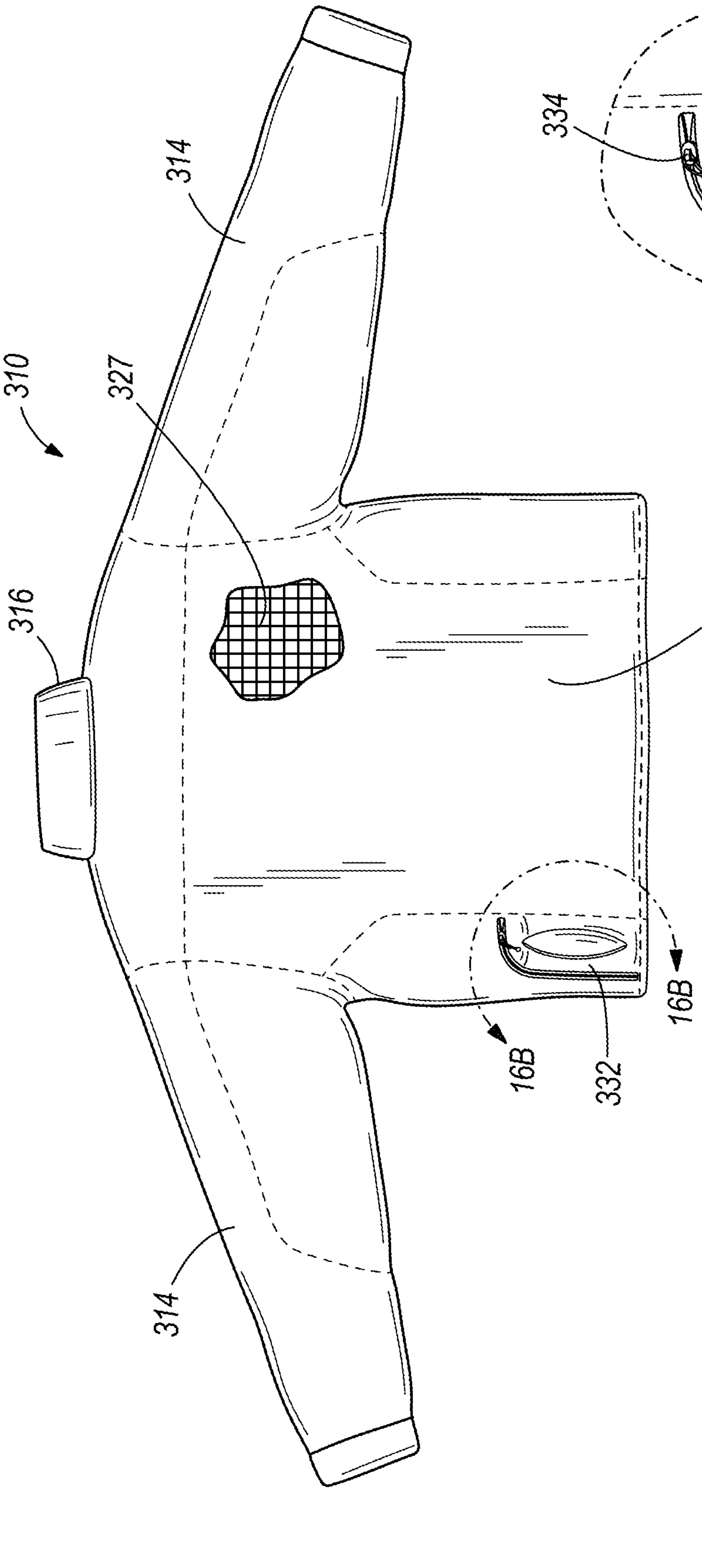
FIG. 15 is a rear view of the jacket of FIG. 14.
Figure 16B:
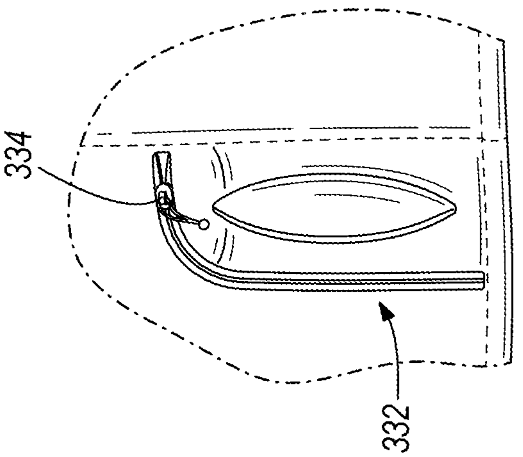
FIG. 16B is a detailed view of a rear compartment of the jacket of FIG. 15, and taken along line 16B-16B of FIG. 15
Figure 16A:
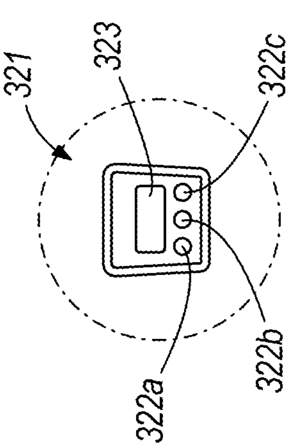
FIG. 16A is a detailed view of a control input of the jacket of FIG. 14, and taken along line 16A-16A of FIG. 14.

FIGS. 14 and 15 illustrate a heated jacket 310 according to one embodiment of the invention. The jacket 310 may be constructed in various sizes to fit a variety of users. The heated jacket 310 is capable of maintaining a temperature of up to 110 degrees Fahrenheit, although in further embodiments lower or greater temperatures are possible depending upon the heat source. The jacket 310 includes typical jacket features such as a torso body 312, arms 314, a back 315, a collar 316, and front pockets 318. The jacket 310 further includes a heating system having multiple heating zones. A front face 320 of the jacket 310 includes a control input 321 that is itself sealed or has a sealed connection to the jacket, such that the control input 321 is protected from environmental conditions. In the illustrated embodiment, the control input 321 is configured to be actuated by a user to direct the control of the jacket heating system and heating zones. As illustrated in FIG. 16A and explained in greater detail below, the control input 321 includes three zone control buttons 322*a*, 322*b*, and 322*c* and an on/off button 323. Further, each of the zone control buttons 322*a*, 322*b*, 322*c* and the on/off button 323 include a display portion 324*a*, 324*b*, 324*c*, 324*d* (FIG. 20; e.g., a LED or other type of illumination embedded into each of the above buttons), respectively, to indicate the status of the jacket based on the inputs associated with pressing these buttons. In other embodiments, the display portion 324 may be configured as a single display panel or display lights/illumination separate from the above buttons. Further, the control input 321 may be configured at different locations on the outside or the inside of the jacket, may be configured with different orientations for the buttons, and may be separated into multiple control inputs at different locations on the jacket.

As illustrated in cutaway portions of FIGS. 14 and 15, the jacket 310 includes a heating system made up of a first heater array 326 and a second heater array 327. The first heater array 326 is disposed in both a left portion 328 and a right portion 330 of the torso body 312. The second heater array 327 is disposed in the back 315. The heating system is further made up of a third heater array 329 (FIG. 20) disposed in the front pockets 318. The heating arrays may include resistive heating coils formed of carbon fibers, high density carbon fibers, or other heating devices. In other embodiments, the heating system may include a fourth heater array (not shown) disposed in the arms 314 and/or a fifth heat array (not shown) disposed in the collar 16, and/or additional heater arrays, and may further have different configurations of the heater arrays, as the different heater arrays may be alternatively configured to extend into or be removed from other parts of the jacket 310.

Figure 17:
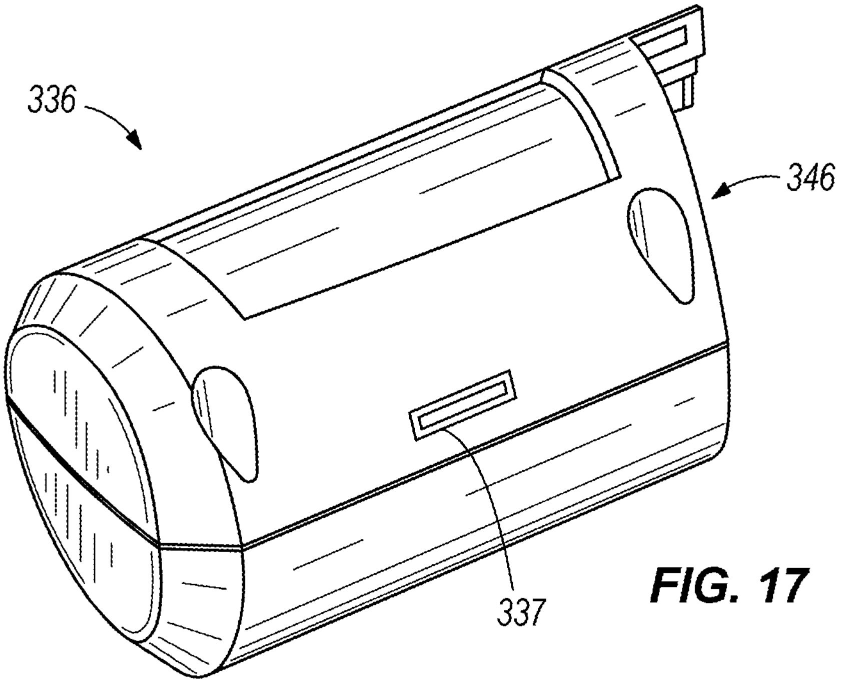
FIG. 17 is a perspective view of a battery holder according to one embodiment of the invention.
Figure 26:
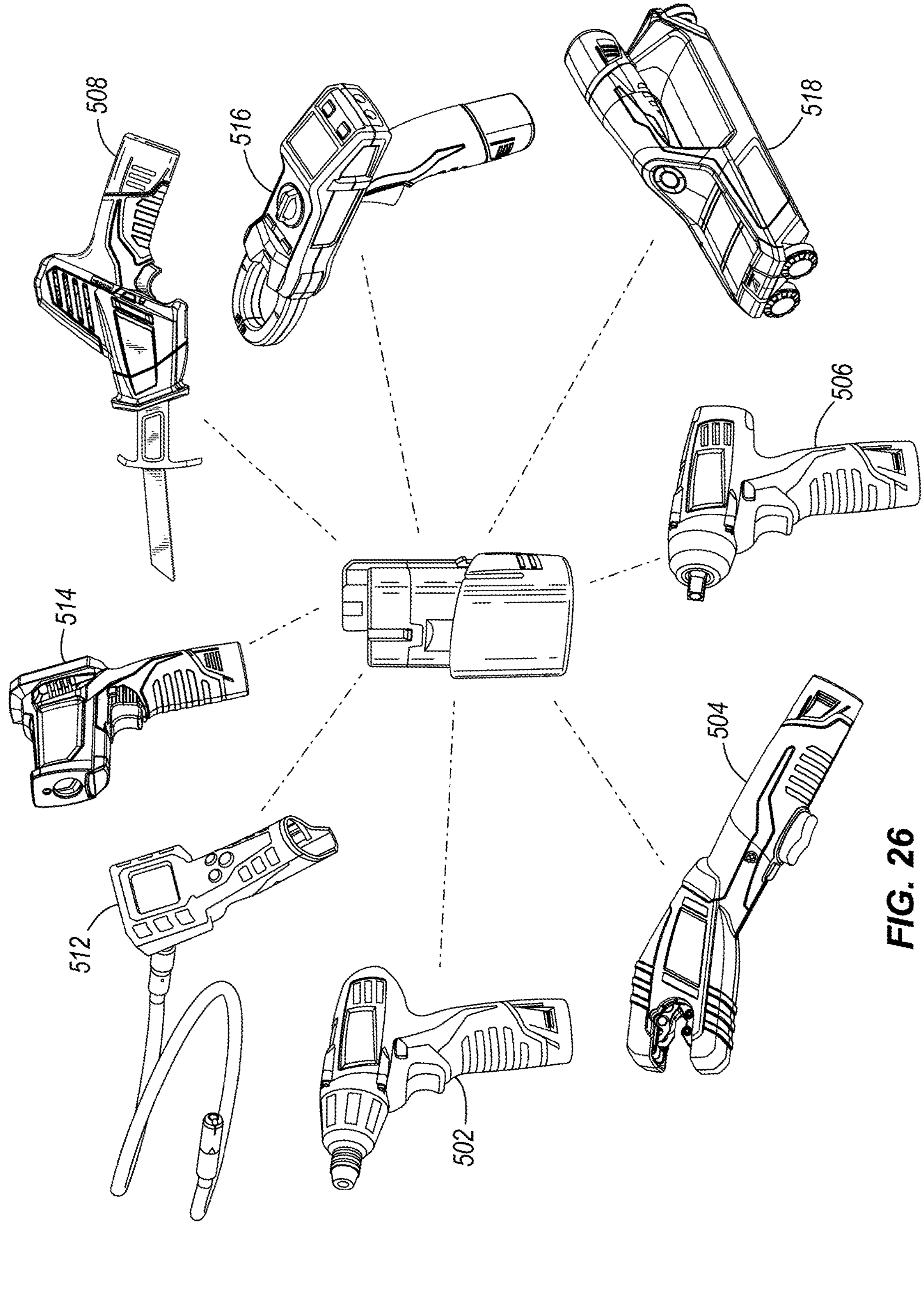
FIG. 26 is a perspective view of tools and devices usable with the battery pack of FIG. 18.

As illustrated in FIG. 15, the heated jacket 310 includes a compartment 332 located on a lower portion of the back torso body 315. The compartment 332 houses an electrical component, such as a battery pack 338 and a battery holder 336. As illustrated in FIG. 16B, the compartment 332 includes a zipper 334, providing selective access by a user to the compartment 332 in order to access the battery pack 338 and other electrical components. FIG. 17 illustrates one example of a battery holder 336. The battery holder 336 is configured to receive the battery pack 338, such as the battery pack 338 illustrated in FIG. 18. The battery holder 336 also includes a USB-type port 337 for communicating with and charging other devices, such as a digital media player, an iPOD®, or similar device Referring to FIG. 18, the battery pack 338 is a lithium-based, rechargeable battery pack. The battery pack 338 is removably and interchangeably connected to the battery holder 336 to provide power to the jacket 310 during operation and to facilitate recharging of the battery pack 338 when not in use. In some embodiments, the battery pack 338 may be used with other types of cordless, battery-powered tools or devices. For example, the battery pack 338 may be usable with a drill, a PVC pipe cutter, an impact driver, and a metal pipe cutter, or other tools. The battery pack 338 may also be usable with a non-motorized sensing device such as a thermal imaging camera, a micro-inspection camera, a wall scanner, a digital multimeter, a thermometer, and a gas detector. A variety of such tools and devices are illustrated in FIG. 26. Furthermore, the battery pack 338 may be used with other power tools or sensing devices not specifically discussed herein.

Figure 18:
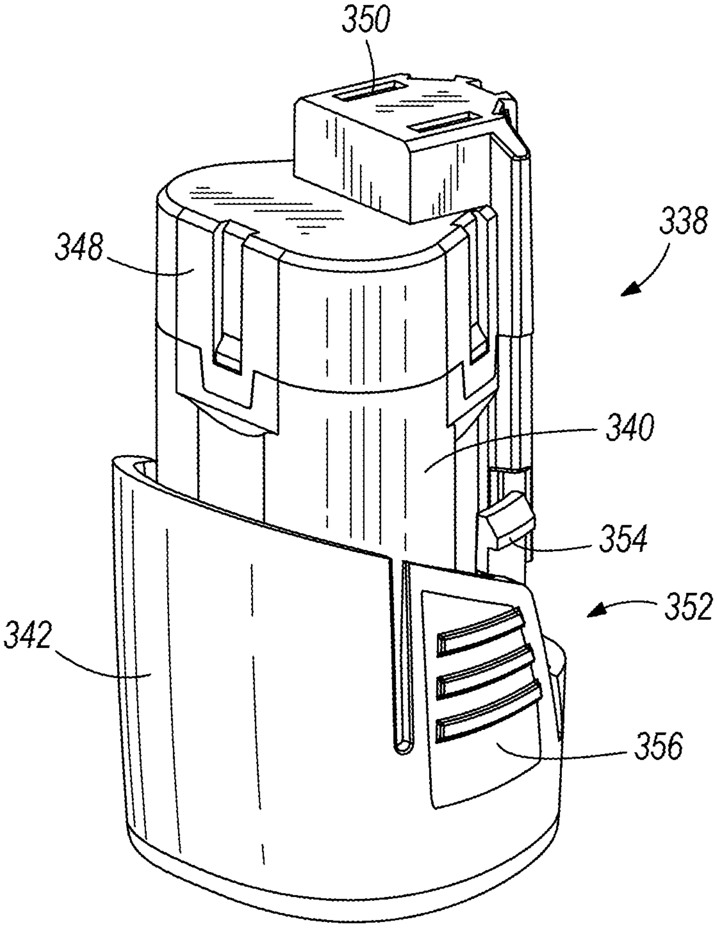
FIG. 18 is a perspective view of a battery pack for use with the battery holder of FIG. 17.
Figure 19:
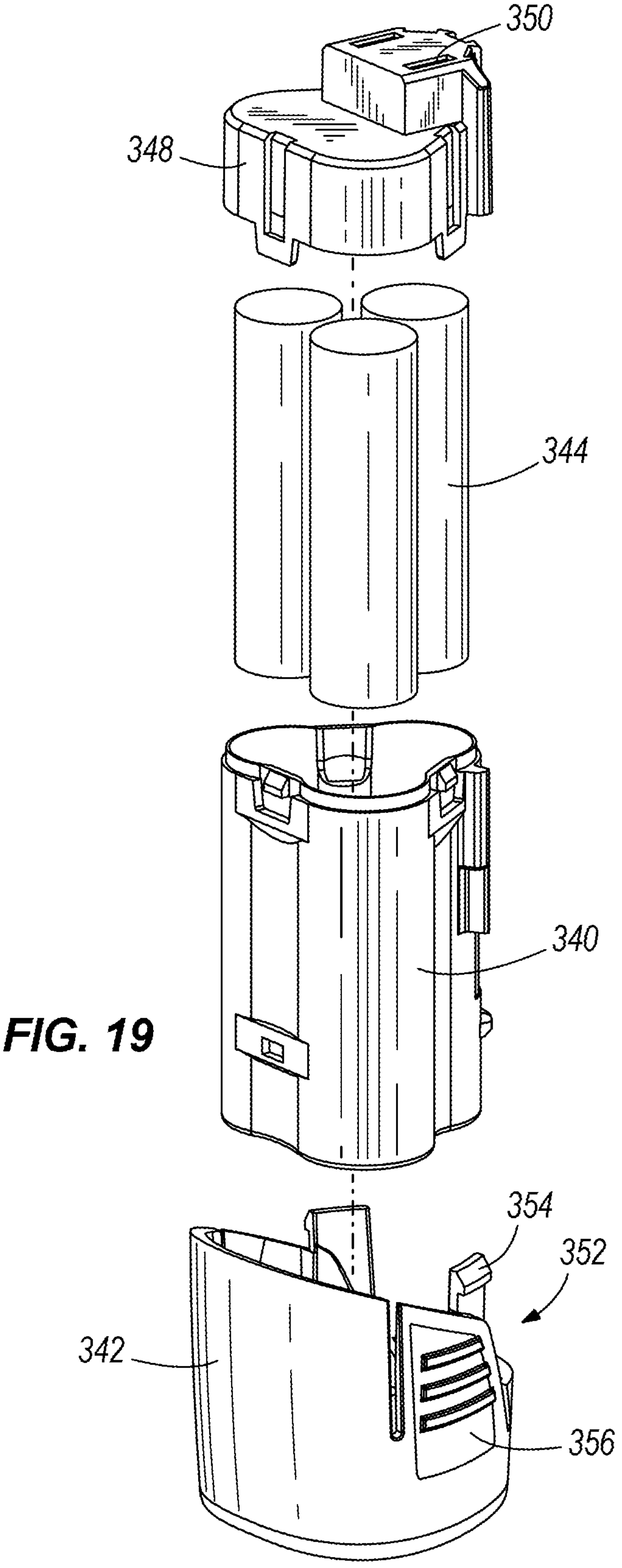
FIG. 19 is an exploded view of the battery pack of FIG. 18.

As illustrated in FIGS. 18 and 19, the battery pack 338 includes a casing 340, an outer housing 342 coupled to the casing 340, and a plurality of battery cells 344 positioned within the casing 340. The casing 340 is shaped and sized to fit within a cavity 346 of the battery holder 336 illustrated in FIG. 17, or alternatively, in a power tool or non-motorized sensing device to connect the battery pack 338 to the tool or device. The casing 340 includes an end cap 348 to substantially enclose the battery cells 344 within the casing 340. The illustrated end cap 348 includes two power terminals 350 configured to mate with corresponding power terminals 360 (FIG. 20) extending within the cavity 346 of the battery holder 336. In other embodiments, the end cap 348 may also include sense or communication terminals that are configured to mate with corresponding terminals within the battery holder or a tool. The outer housing 342 includes a latching arrangement 352 for positively engaging the battery pack 338 with the battery holder 336. The latching arrangement 352 includes latching tabs 354 and resilient actuating portions 356. The latching tabs 354 are configured to engage corresponding recesses within the cavity 346 of the battery holder 336. The resilient actuating portions 356 are coupled to the latching tabs 354 and are configured for a user to selectively disengage the latching tabs 354 from the battery holder 336.

As shown in FIG. 19, the battery pack 338 includes three battery cells 344 positioned within the casing 340 and electrically coupled to the terminals 350. The battery cells provide operational power (e.g., DC power) to the jacket 310 or other device. In the illustrated embodiment, the battery cells 344 are arranged in series, and each battery cell has a nominal voltage of approximately four-volts (4.0V), such that the battery pack 338 has a nominal voltage of approximately twelve-volts (12V). The cells 344 also have a capacity rating of approximately 1.4 Ah. In other embodiments, the battery pack 338 may include more or fewer battery cells 344, and the cells 344 can be arranged in series, parallel, or a serial and parallel combination. For example, the battery pack 338 can include a total of six battery cells in a parallel arrangement of two sets of three series-connected cells. The series-parallel combination of battery cells creates a battery pack having a nominal voltage of approximately 12V and a capacity rating of approximately 2.8 Ah. In other embodiments, the battery cells 344 may have different nominal voltages, such as, for example, 3.6V, 3.8V, 4.2V, etc., and/or may have different capacity ratings, such as, for example, 1.2 Ah, 1.3 Ah, 2.0 Ah, 2.4 Ah, 2.6 Ah, 3.0 Ah, etc. In other embodiments, the battery pack 338 can have a different nominal voltage, such as, for example, 10.8V, 14.4V, etc. In the illustrated embodiment, the battery cells 344 are lithium-ion battery cells having a chemistry of, for example, lithium-cobalt (Li—Co), lithium-manganese (Li—Mn), or Li—Mn spinel. In other embodiments, the battery cells 344 may have other suitable lithium or lithium-based chemistries.

Figure 20:
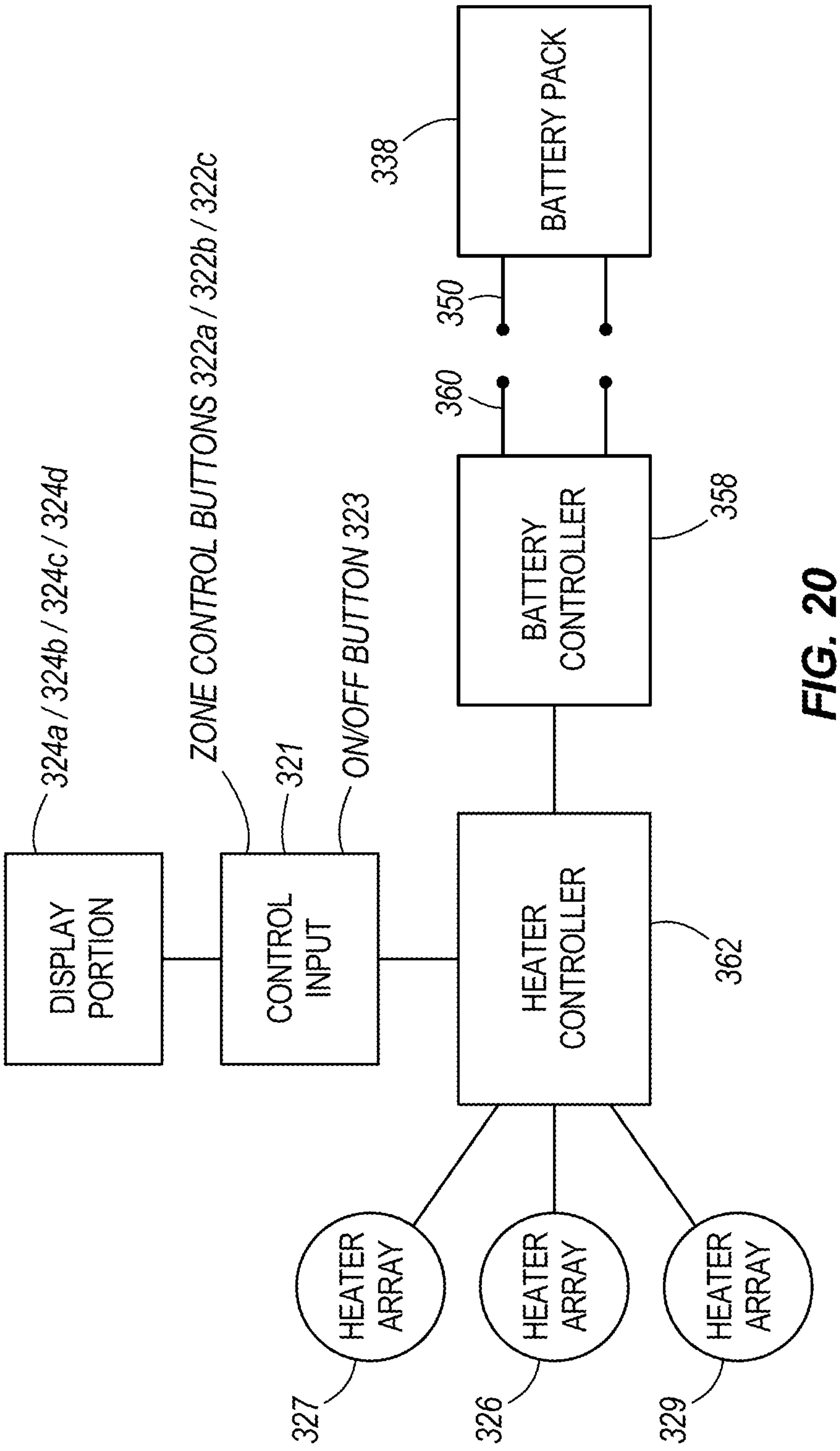
FIG. 20 is an electrical block diagram for the jacket of FIG. 14.

The heated jacket 310 includes control circuitry for the heating system having multiple heating zones. FIG. 20 is an electrical block diagram of the heated jacket 310. A battery controller 358 receives electricity from the battery pack 338 via battery terminals 360 (disposed within the battery holder 336). The battery controller 358 may be configured to monitor a state of charge of the battery pack 338 and, if necessary, shutdown the heater array 326.

As shown in FIG. 20, a heater controller 362 receives inputs from the control input 321 and selectively powers the heater arrays 326, 327, 329 depending upon a desired thermal output. The display portion 324*a*, 324*b*, 324*c*, 324*d*, associated with the particular control input button described above, is illuminated based upon the current status of that input button. The heater controller 362 may be configured to monitor a plurality of conditions of the jacket 310 including, but not limited to, an amount of current drawn by the heater arrays 326, 327, 329. The controllers 358, 362 are, for example, microprocessors, microcontrollers, or the like, and are configured to communicate with one another. In the illustrated embodiment, the battery controller 358 provides information to the heater controller 362 related to a battery pack temperature or voltage level. The heater controller 362 and the battery controller 358 also include low voltage monitors and state-of-charge monitors. The monitors are used to determine whether the battery pack 338 is experiencing a low voltage condition, which may prevent proper operation of the heater arrays 326, 327, 329 or if the battery pack 338 is in a state-of-charge that makes the battery pack 338 susceptible to being damaged. If such a low voltage condition or state-of-charge exists, the heater arrays 326, 327, 329 are shut down or the battery pack 338 is otherwise prevented from further discharging current to prevent the battery pack from becoming further depleted.

In the illustrated embodiment, the heating system and heating arrays 326, 327, 329 are configured to be actuated via the control input 321 (FIG. 14). The on/off button 323 is configured to turn the heating system on and off and also is configured to change thermal output setting of the heating system, including a high thermal output setting, a medium thermal output setting, and low thermal output setting. More specifically, the on/off button is configured to turn the heating system on after being pressed and held for a designated period of time (e.g., 1.5 seconds), such that all heating arrays 326, 327, 329 are turned on and automatically set to an initial predetermined thermal output setting. Subsequent presses of the on/off button change the thermal output setting according to sequence, such that the next press of the on/off button changes the heating system to the high thermal output setting. A further press of the on/off button changes the heating system to the medium thermal output setting. A further press of the on/off button changes the heating system to the low thermal output setting. A further press of the on/off changes the heating system back to the high thermal output setting to complete the sequence of high, medium, low, high, medium, low, and so on. The heating system is on, if any of the heating arrays 326, 327, 329 are on. The on/off button is configured to turn the heating system off after being pressed and held for designated period of time (e.g., 1.5 seconds). In other embodiments, it is conceivable that the number of thermal output settings, the initial thermal output setting, and the sequence of thermal output settings could vary.

While the heating system is on, the zone control buttons 322*a*, 322*b*, 322*c* are each configured to turn a particular heater array on and off. More specifically, zone control button 322*a* is configured to turn the first heater array 326 on and off, zone control button 322*b* is configured to turn the second heater array 327 on and off, and zone control button 322*c* is configured to turn the third heater array 329 on and off. Subsequent presses of any one of the zone control buttons switches alternate the associated heating array between on and off. In other embodiments, it is conceivable that multiple heater arrays may be controlled individually via a single control input button or multiple control input buttons.

The heated jacket 310 illustrated in FIGS. 14 and 15 may be operated as follows. To turn on the heated jacket 310, a user presses and holds the on/off button 323 for a designated period of time (e.g., 1.5 seconds). When first turned on, the heater controller 362 causes the heated jacket 310 to enter pre-heat mode. The heated jacket 310 remains in a pre-heat mode for a period (e.g., five minutes) and then the heater controller 362 switches the heater arrays 326, 327, 329 to a medium thermal output setting. The user may adjust the thermal output setting by actuating the on/off button 323, as discussed above. Each press of the on/off button 323 will cycle the heater controller 362 through one of a sequence of thermal output settings (e.g., high, medium, low). In order to turn off the heated jacket 10, the user presses and holds the on/off button for a designated period of time (e.g., 1.5 seconds).

As mentioned previously, the control input buttons 322*a*, 322*b*, 322*c*, 323 each include an illuminated display portion 324*a*, 324*b*, 324*c*, 324*d* to indicate a status of the heating system. As discussed above, the display portion may be, for example, one or more LEDs. The display portions 324*a*, 324*b*, 324*c* illuminate to indicate that their associated heating arrays are on. In the pre-heat mode, the display portion 324*d* on the on/off button 323 flashes red. At a low thermal output setting, the display portion 324*d* glows blue. At a medium thermal output setting, the display portion 324*d* glows white. At a high thermal output setting, the display portion 324*d* glows red. Other embodiments may use various other colors or light patterns to indicate thermal output settings. Still other embodiments may indicate a state of charge of the battery pack 338.

Various modifications of the control method or sequence are possible. For example, in other embodiments, the user may select a desired temperature rather than a thermal output setting.

Figure 21:
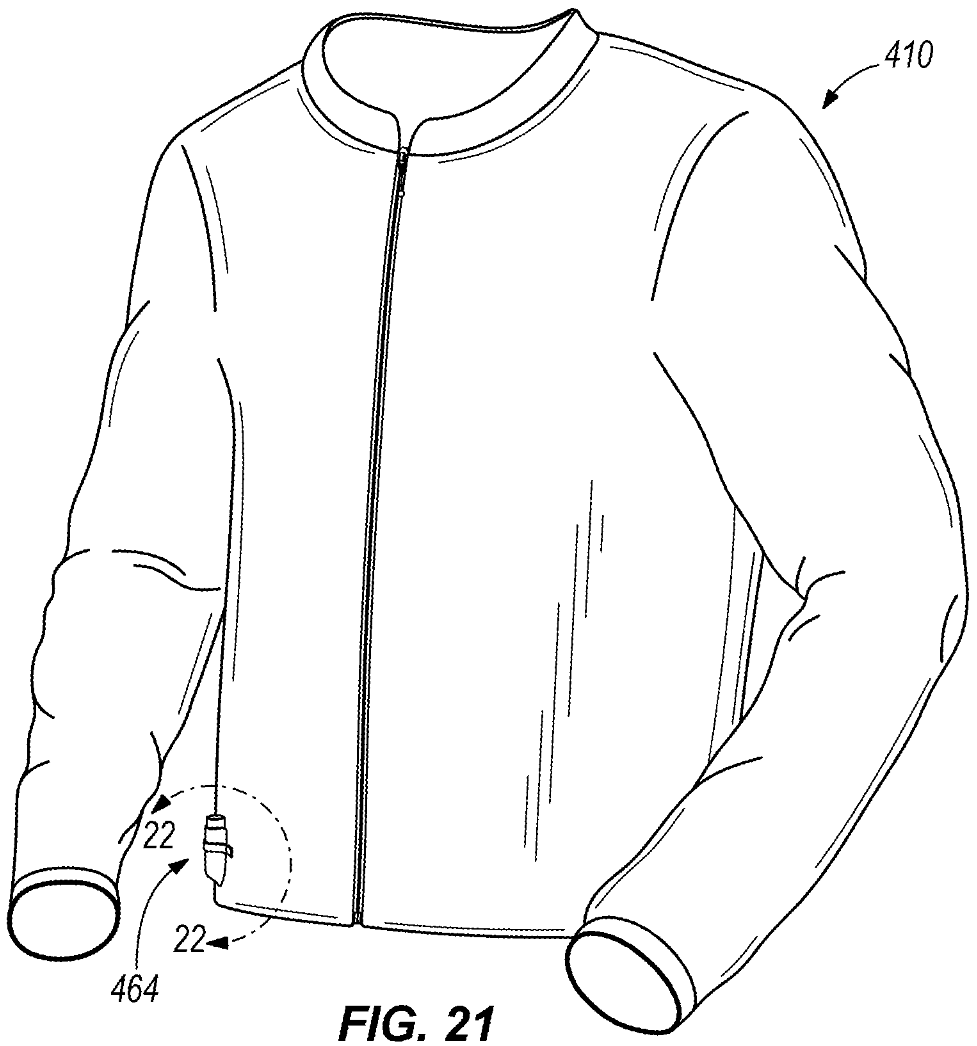
FIG. 21 is an image of a heated jacket including a heating module according to another embodiment of the invention.
Figure 22:
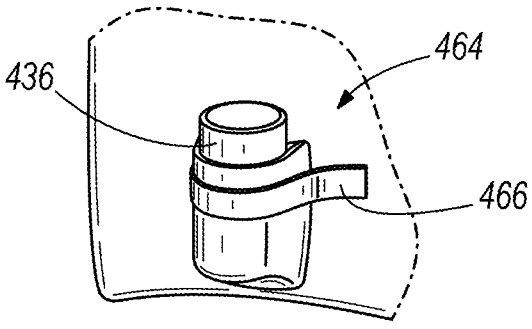
FIG. 22 is an enlarged view of the heated jacket including the heating module of FIG. 21.

FIG. 21 illustrates a heated jacket 410 according to another embodiment of the invention. The heated jacket 410 may be constructed in various sizes to fit a variety of users. FIG. 22 is an enlarged view of a heating module 464, which is coupled to an outside surface of the jacket 410 by way of a strap 466. Alternatively, the heating module 464 may be coupled to an inner surface of the jacket 410 or disposed inside of an inner pocket of the jacket 410.

The heating module 464 includes a battery pack holder 436 (FIGS. 23 and 24) and a battery pack 338 (FIG. 18). The heating module 464 is electrically coupled to one or more heating coils (not shown) positioned within the jacket 410 to heat the jacket and provide heat to a user wearing the jacket. In the illustrated embodiment, multiple heating coils are employed and positioned in various locations, or zones, within the jacket. For example, separate heating coils may be positioned in an upper torso area and a lower torso area, in a back area, and in front pockets, and may be separately controllable by the user. In further embodiments, a single heating coil may be used, or the heating coils may be positioned at other locations within the jacket, (e.g., the back, arms, etc.).

Figure 23:
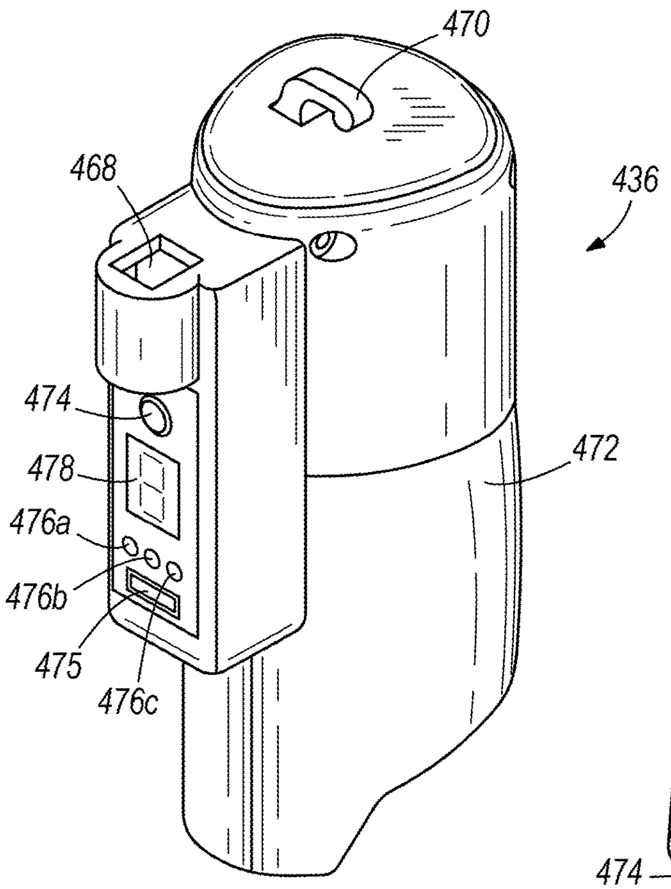
FIG. 23 is a top perspective view of a portion the heating module of FIG. 21.
Figure 24:
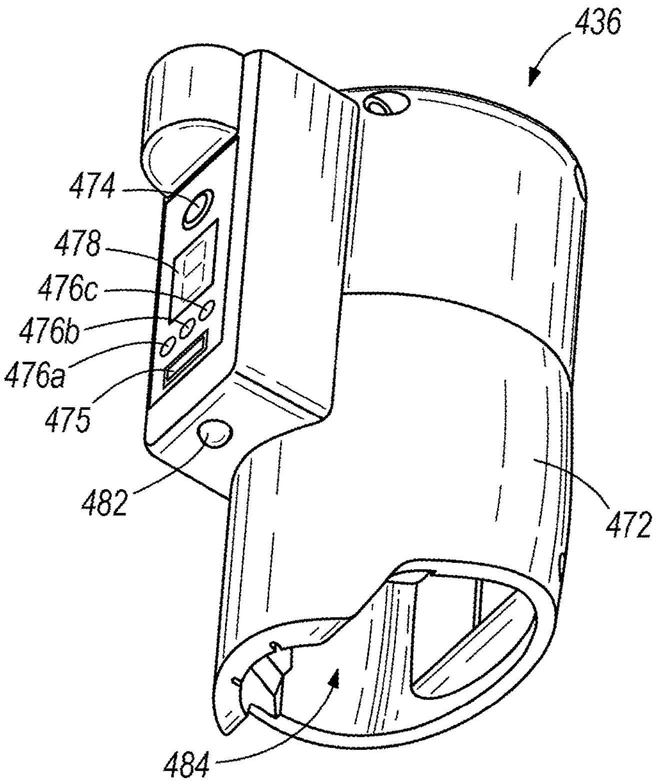
FIG. 24 is a bottom perspective view of the portion of the heating module of FIG. 23.

FIGS. 23 and 24 illustrate the battery holder 436 of the heating module 464 in greater detail. With reference to FIG. 23, the battery holder 436 includes an aperture 468 for receiving an end of a cord (not shown), the cord being connected to the one or more heating coils and including a male connector terminal. A female connector (not shown) is positioned within the battery holder 436 adjacent the aperture 468 to receive the male connector and form an electrical connection between the heating coils and the battery pack 338. The battery holder 436 also includes a hook 470 for securing the cord disposed between the connector and the jacket 410, and a USB port 475 for communicating with and charging other devices, such as a digital media player, an iPOD®, or similar device.

Figure 25:
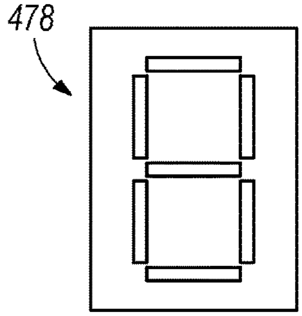
FIG. 25 is a front view of a display for positioning in an aperture of the heating module of FIG. 23.

With further reference to FIG. 23, the battery holder 436 includes a housing portion 472 for electrical components, including a circuit board (not shown). The housing portion 472 includes a first on/off button 474, three zone control buttons 476*a*, 476*b*, 476*c*, and a display 478. The first button 174 and the zone buttons 476*a*, 476*b*, 476*c* are capable of communicating with the electrical components. In the illustrated embodiment, the on/off button 474 and zone control buttons 476*a*, 476*b*, 476*c* are configured and operate similarly to the above control input buttons 322*a*, 322*b*, 322*c*, 323. In the illustrated embodiment of FIG. 25, the display 478 is a seven segment display for representing a heating level indicative of the temperature of the heating coils.

With reference to FIG. 24, the battery holder 436 includes a power indicator 482, such as a light emitting diode (LED) that displays to the user when lit that the battery is connected, the heating coils are on, or the like. A portion of the battery holder 436 defines a battery port 484 for receiving the battery pack 338 (FIG. 18). In other embodiments, the battery holder 436 includes a fuel gauge that displays the amount of battery power remaining.

Figure 27:
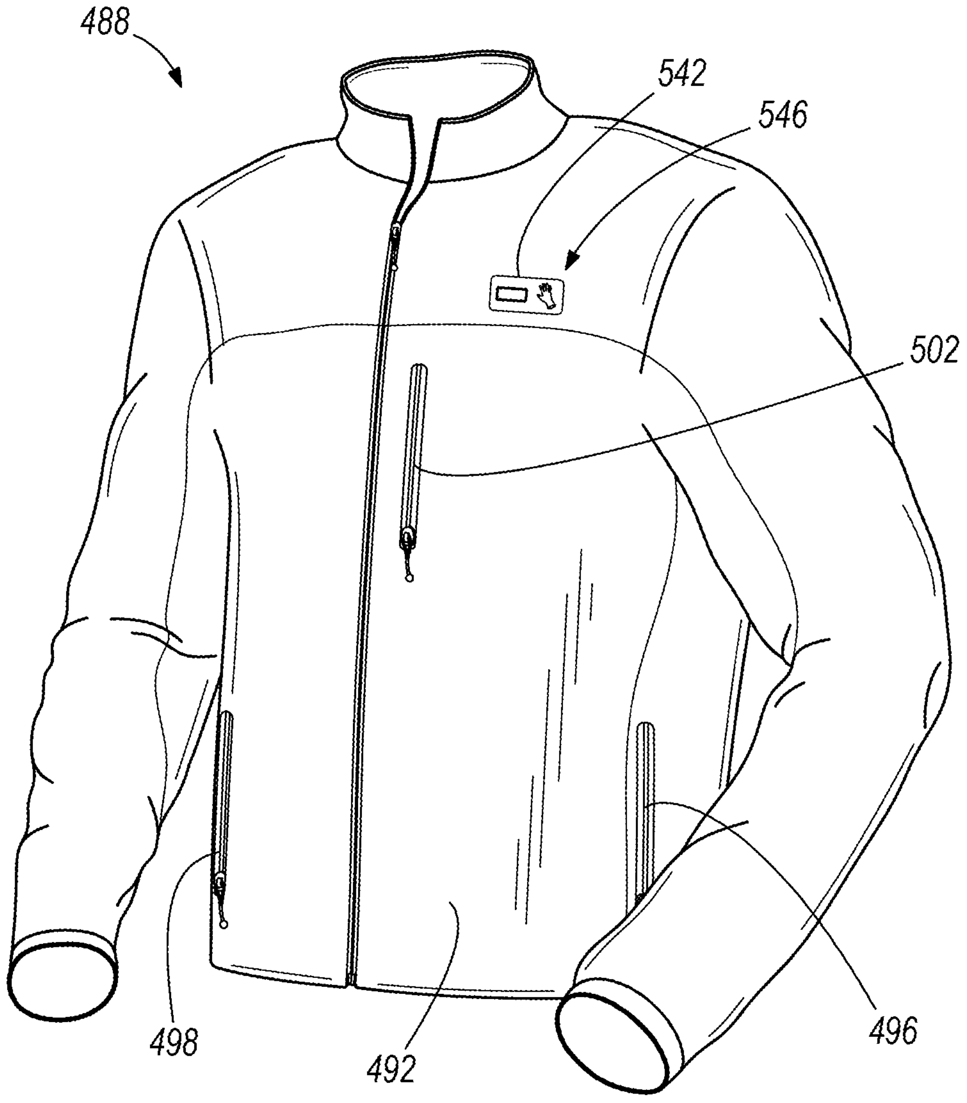
FIG. 27 is a perspective view of a jacket according to another embodiment of the invention.
Figure 30:
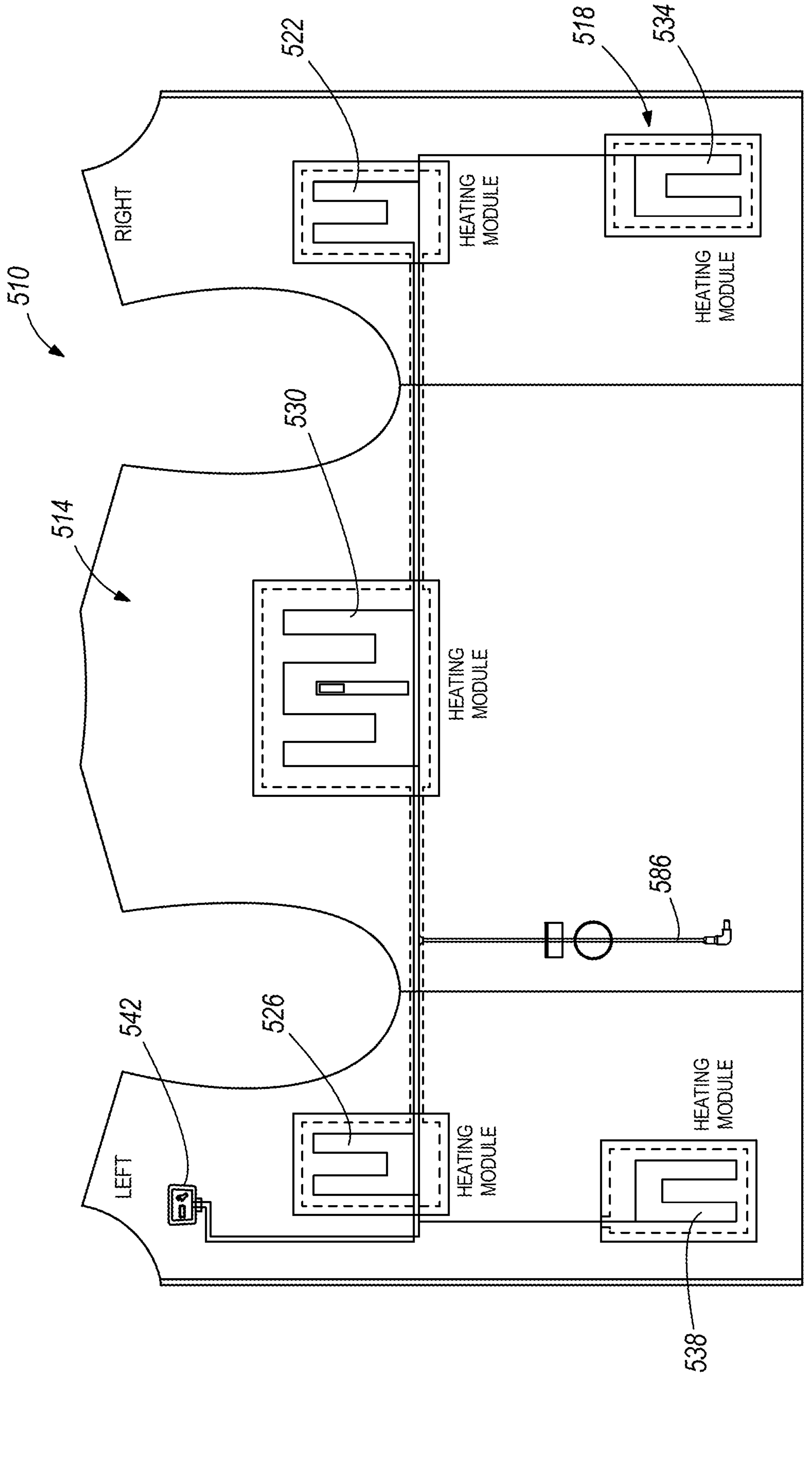
FIG. 30 is a circuit diagram for the jacket of FIG. 27.
Figure 38:
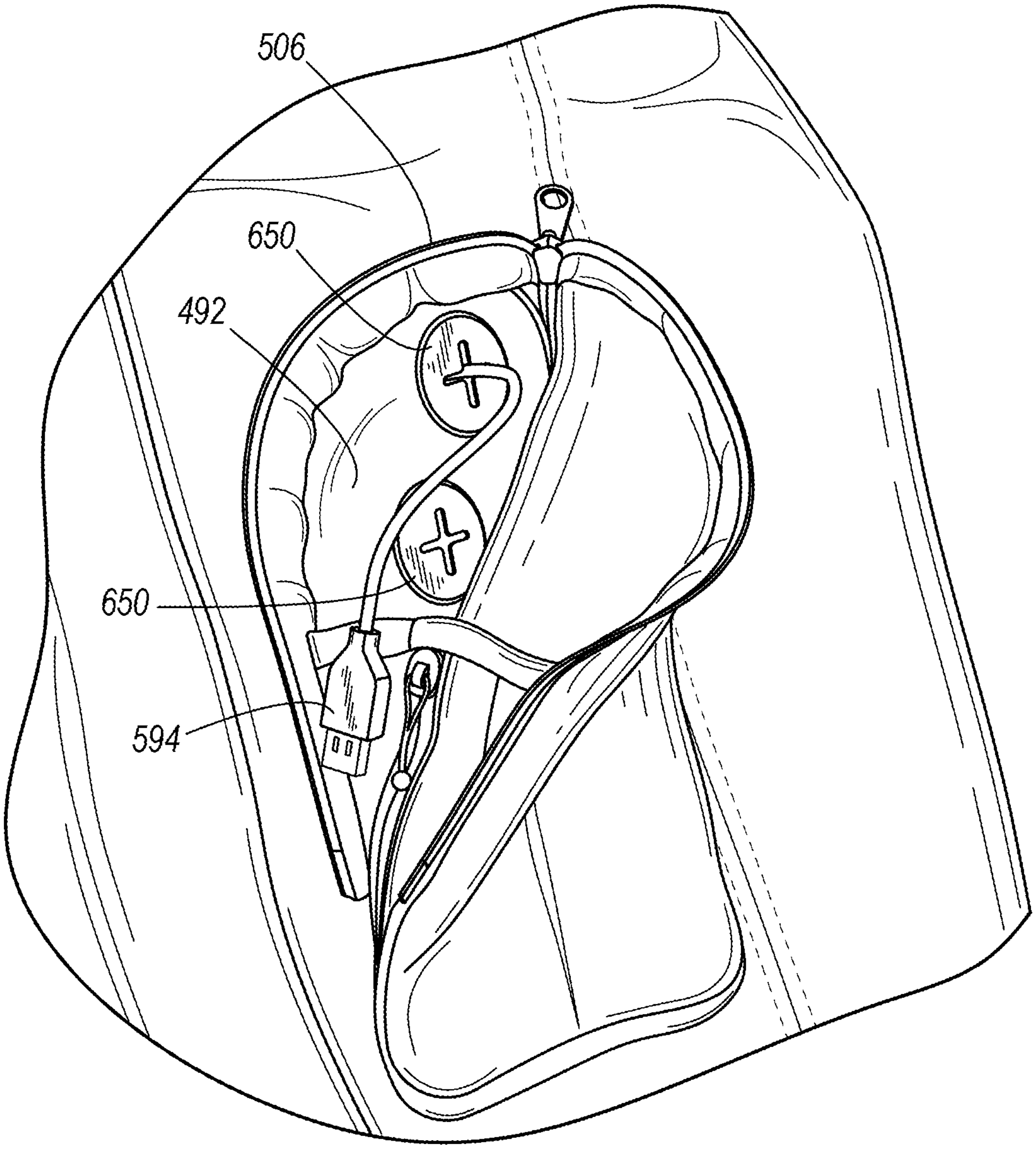
FIG. 38 illustrates a pocket, including wire routing features, of the jacket of FIG. 14.

FIG. 27 illustrates a heated jacket 488 according to another embodiment of the invention. The jacket 188 includes an outer shell 492 with left and right front pockets 496 and 498, and a chest pocket 502. FIG. 38 illustrates a rear compartment 506 of the jacket 488. Referring to FIG. 30, the heated jacket 488 includes a heating system 510 including a core heater array 514 and a pocket heater array 518. The core heater array 514 includes a right chest heating module 522, a left chest heating module 526, and a back heating module 530. The pocket heater array 518 includes a right pocket heating module 534 and a left pocket heating module 538. The heater arrays 514 and 518 may include resistive heating coils formed of carbon fibers, high density carbon fibers, or other heating devices.

Figure 28:
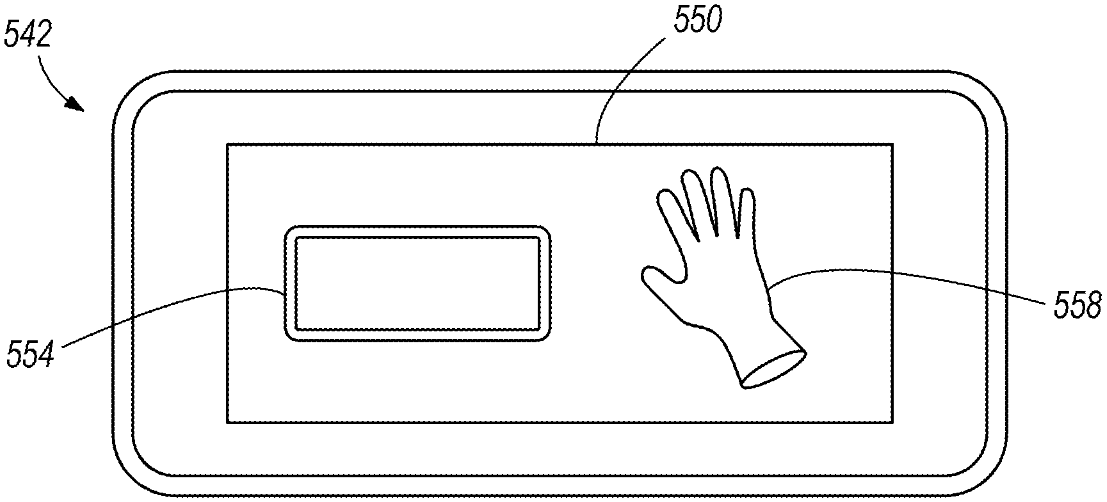
FIG. 28 is a front view of a control input of the jacket of FIG. 27.

The core heater array 514 and pocket heater array 518 are controlled via a heater control module 542. The heater control module 542 is coupled to a chest portion 546 of the jacket 488 (FIG. 27). Referring to FIG. 28 an external surface 550 of the heater control module 542 provides access to a first heater control button 554 and a second heater control button 558. The first heater control button 554 may be, for example a control input for the core heater array 514 (FIG. 30), while the second heater control button 558 may be, for example, a control input for the pocket heater array 518.

Figure 29:
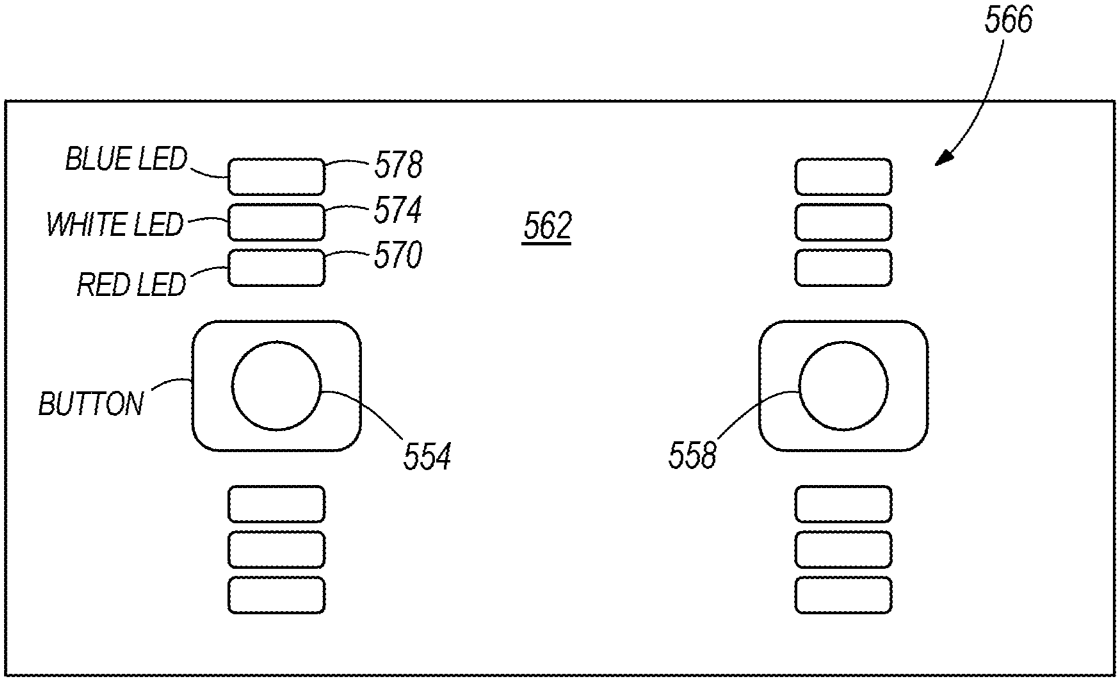
FIG. 29 is a diagram of a printed circuit board of the control input of FIG. 28.

Referring to FIG. 29, the first heater control button 554 and the second heater control button 558 are coupled to a printed circuit board (PCB) 562 of the heater control module 542. Each of the first control button 554 and the second control button 558 has an array of light emitting diodes (LEDs) 566 associate with it. More specifically, each button has associated with it a first pair of LEDs (e.g., red LEDs) 570, a second pair of LEDs (e.g., white LEDs) 574, and a third pair of LEDs (e.g., blue LEDs) 578. The LEDs 566 illuminate the external surface 550 of the heater control module 542 (FIG. 28) to provide indication of a control mode of the core heater array 514 (as selected by the first button 554) or the pocket heater array 518 (as selected by the second button 558). For example, illumination of the red LEDs 570 may indicate a high thermal output setting, illumination of the white LEDs 574 may indicate a medium thermal output setting, and illumination of the blue LEDs 578 may indicate a low thermal output setting. The heater arrays 514 and 518 are indicated as being off when no LED is illuminated.

To turn on either of the heater arrays 514 or 518, a heater control button 554 or 558, respectively, is pressed by the user and held for a period of, for example, 0.5-2.5 seconds. A temperature setting (e.g., high, medium, or low) of the core heater array 514 or pocket heater array 518 may be selected by again pressing the respective first heater control button 554 or the second heater control button 558. The heater arrays 514, 518 may be turned off by pressing and holding the respective heater control buttons 554, 558 for a period of 0.5 to 2.5 seconds.

Figure 31:
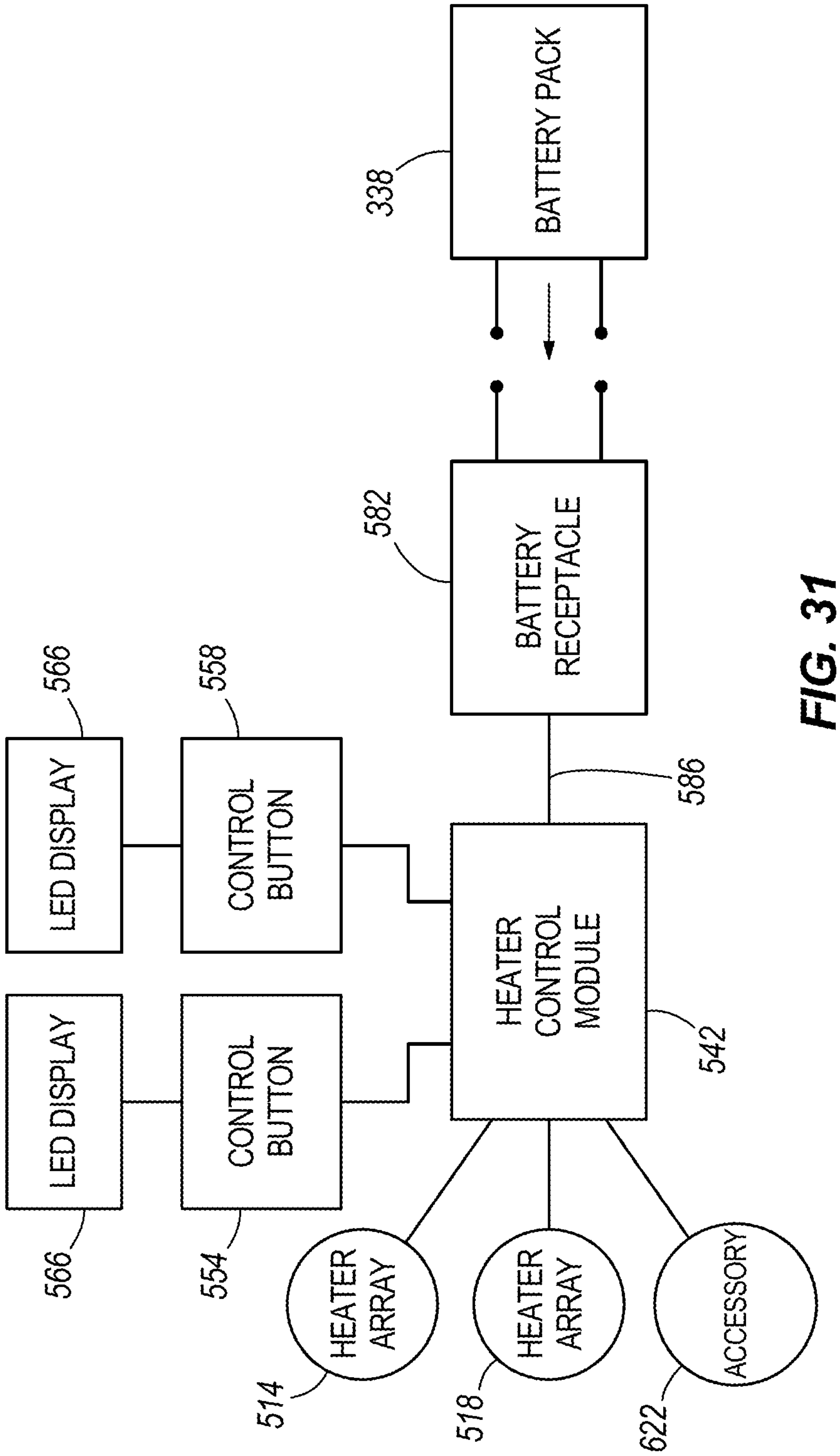
FIG. 31 is a block diagram of an alternative construction of the jacket of FIG. 27.
Figure 32:
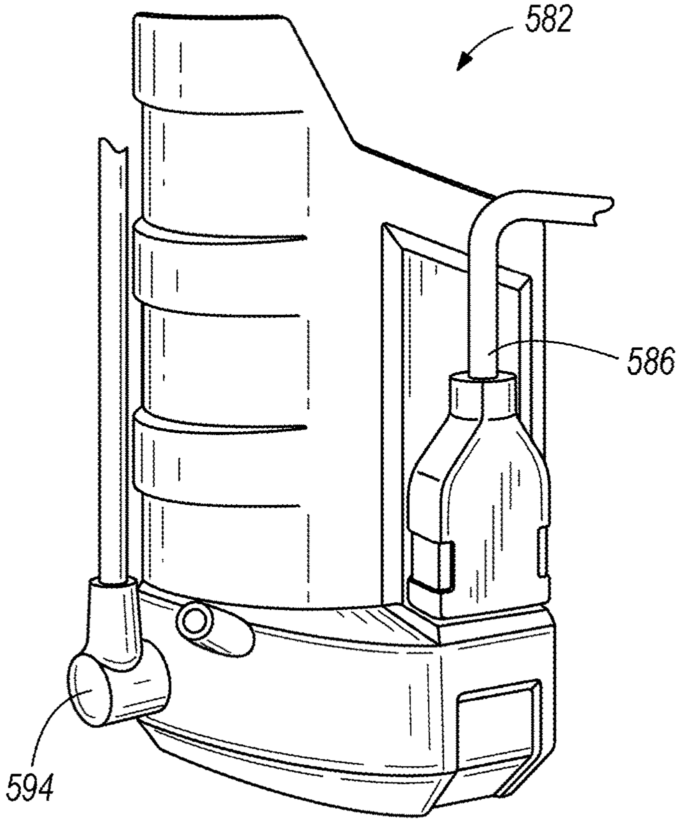
FIG. 32 is a perspective view of a battery receptacle module.
Figure 33:
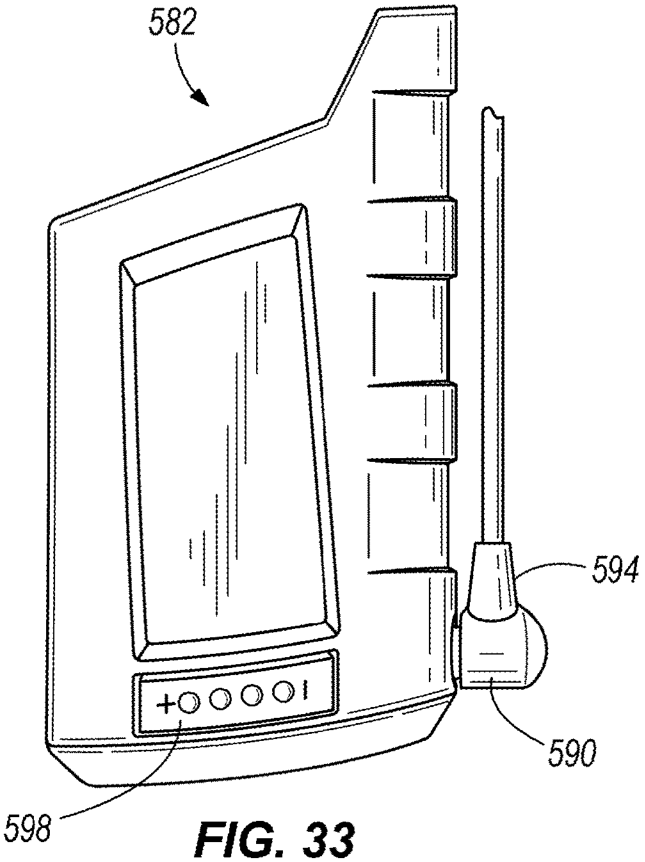
FIG. 33 is another perspective view of the battery receptacle module of FIG. 32.

FIG. 31 is an electrical block diagram of the heated jacket 488. A battery receptacle 482 receives electricity from a battery pack (e.g., the battery pack 338 of FIG. 5) and supplies electricity to the heater control module 542 for distribution to the heater arrays 514, 518. FIG. 32 illustrates the battery receptacle 582 according to a first configuration. The battery receptacle 582 is configured to receive the 12 volt lithium-ion battery pack 338 (FIG. 18). A heater supply cable 586 from the heater control module 542 is detachably coupled the battery receptacle 582. The battery receptacle 582 also includes an accessory port 590. The accessory port 590 may be in the form of a USB outlet for receiving a USB cable 594. The USB cable may, in turn, be coupled to an accessory device such as smart phone or MP3 player. Referring to FIG. 33, the battery receptacle 582 includes a battery state-of-charge indicator 598. A state-of-charge may be indicated by the illumination of one or more LEDs.

Figure 34:
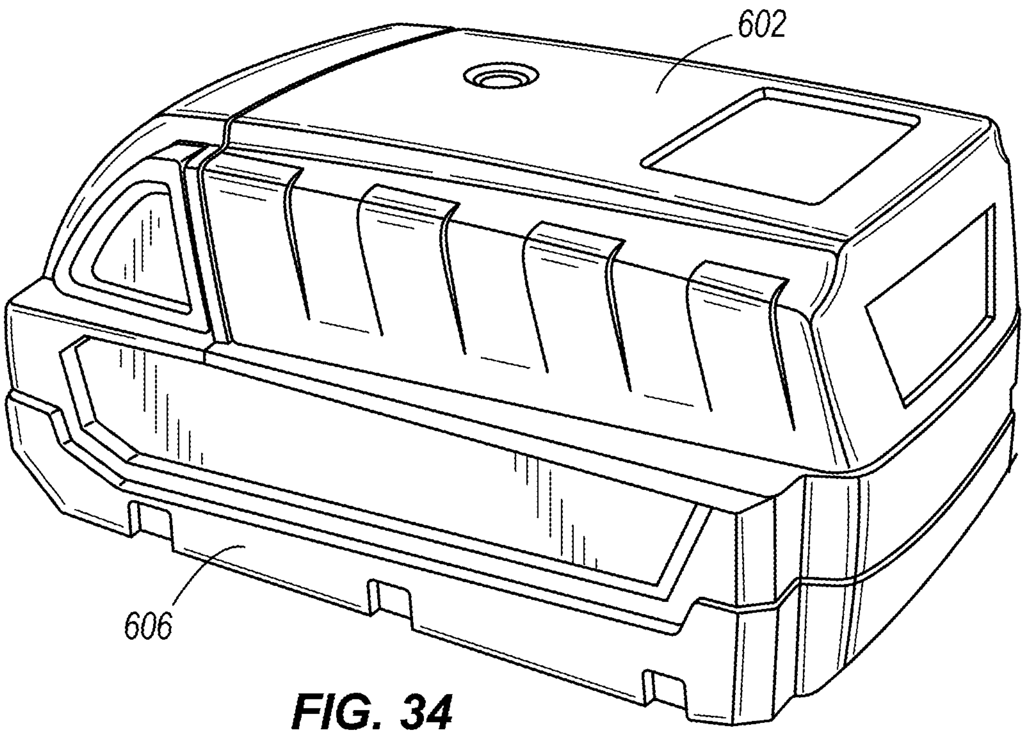
FIG. 34 is a perspective view of a battery and battery receptacle module according to another aspect of the invention.

FIG. 34 illustrates a battery receptacle 602 according to another configuration. The battery receptacle 602 is configured to receive, for example, an 18 volt lithium-ion battery pack 606.

Figure 35:
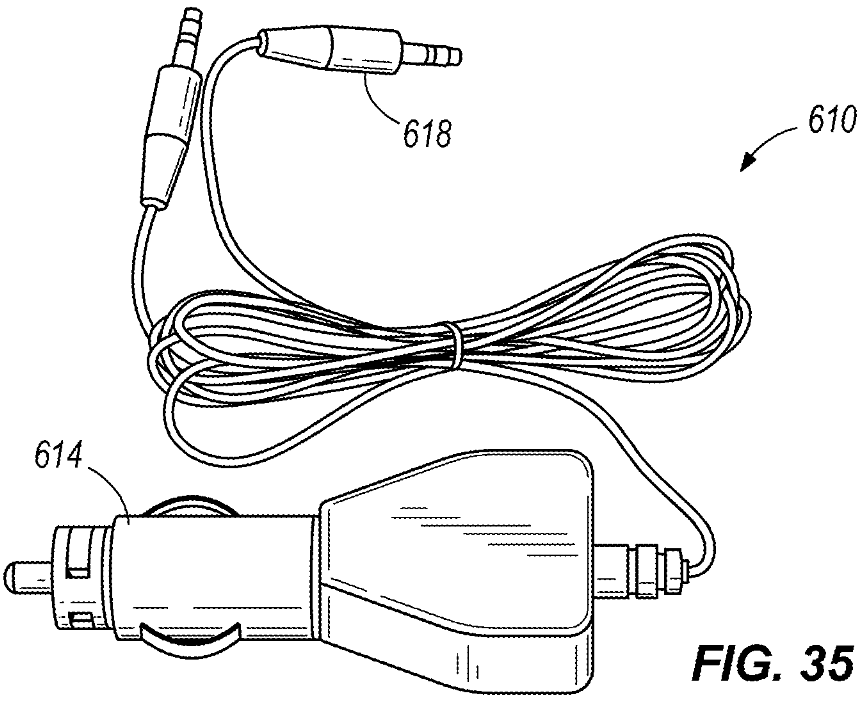
FIG. 35 illustrates a power source adapter for use with the jacket of FIG. 27.

FIG. 35 illustrates an adapter 610 that may be used with the heated jacket in place of a battery and battery receptacle. The adapter 610 includes an input plug 614 for mating with a 12V outlet cigarette lighter-type socket of a motor vehicle. An output plug 618 connects to heated jacket 488.

Referring to FIG. 31, the heater control module 542 may also interface with a heated accessory device 622. When a heated accessory device 622 is coupled to the jacket 488 and detected by the heater control module 542, the heater control module 542 deactivates the pocket heater array 518 and selective provides power to the heated accessory device 622. The second heater control button 558 may then be used to control a thermal output setting of the accessory device 622 in a manner similar to that used to control the pocket heater array 518.

Figure 36:
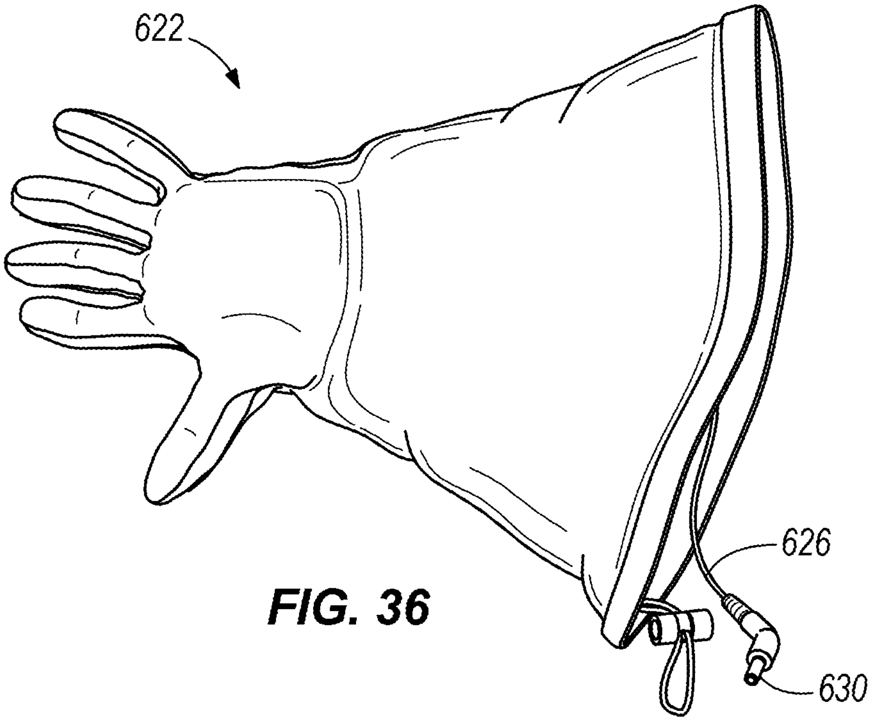
FIG. 36 illustrates an electrically heated glove coupled to an accessory port of a heated jacket.

FIG. 36 illustrates an exemplary heated accessory device 622, in the form of an electrically heated glove 622. Each glove 622 includes a resistive heating element. A power cord 626 is coupled to the heating element. The power cord 626 includes a connector 630 for connecting to the electrical system of the heated jacket 488.

Figure 37:
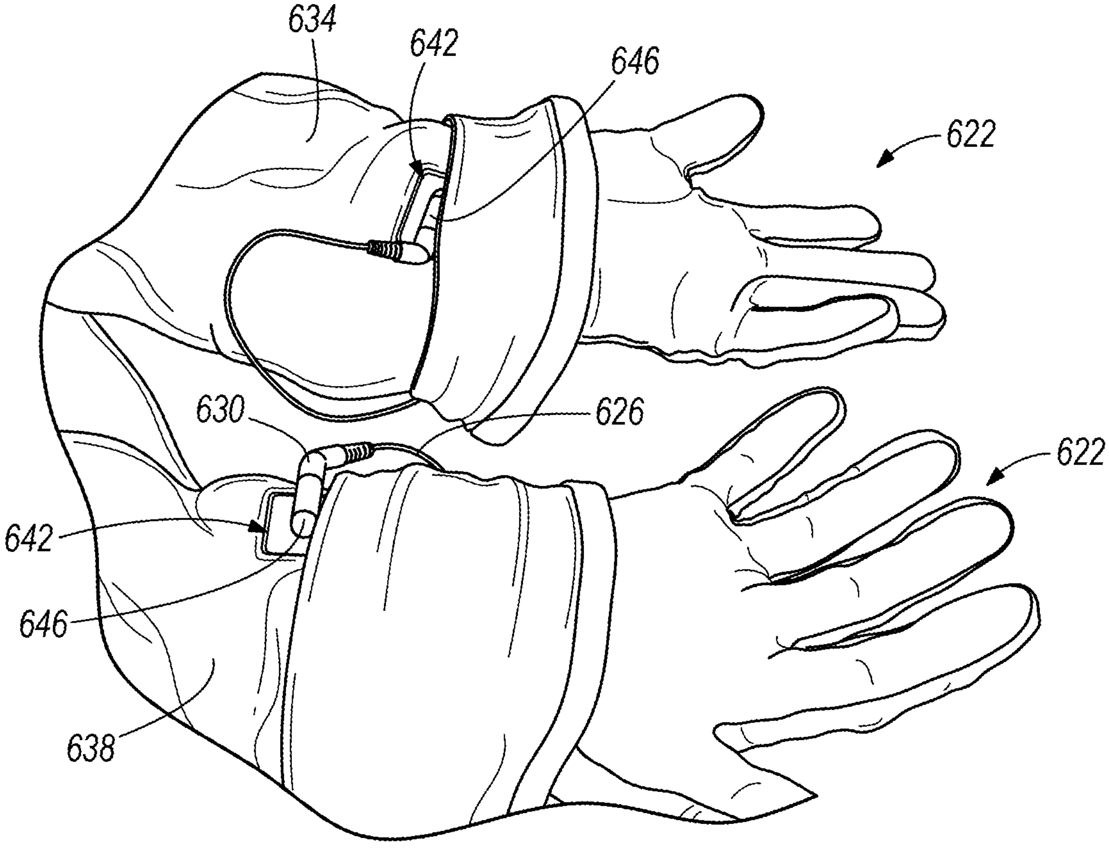
FIG. 37 illustrates the electrically heated glove of FIG. 36.

FIG. 37 illustrates the heated gloves 622 connected to a left sleeve portion 634 and a right sleeve portion 638 of a heated jacket. An accessory power port 642 is coupled to each sleeve portion 634, 638. The accessory power ports 642 include a body 646 that is coupled to an outer surface 650 of the sleeves 634, 638 by sewing, rivets, adhesives or other attachment means. The body 646 defines a power receptacle. The power receptacle is in electrical communication with the heater control module 542 (FIG. 31). Each power receptacle is configured to receive the connector 630 of the power cord 626 of a heated accessory device 322, such that the device is selectively powered by the heater control module 542.

Figure 39:
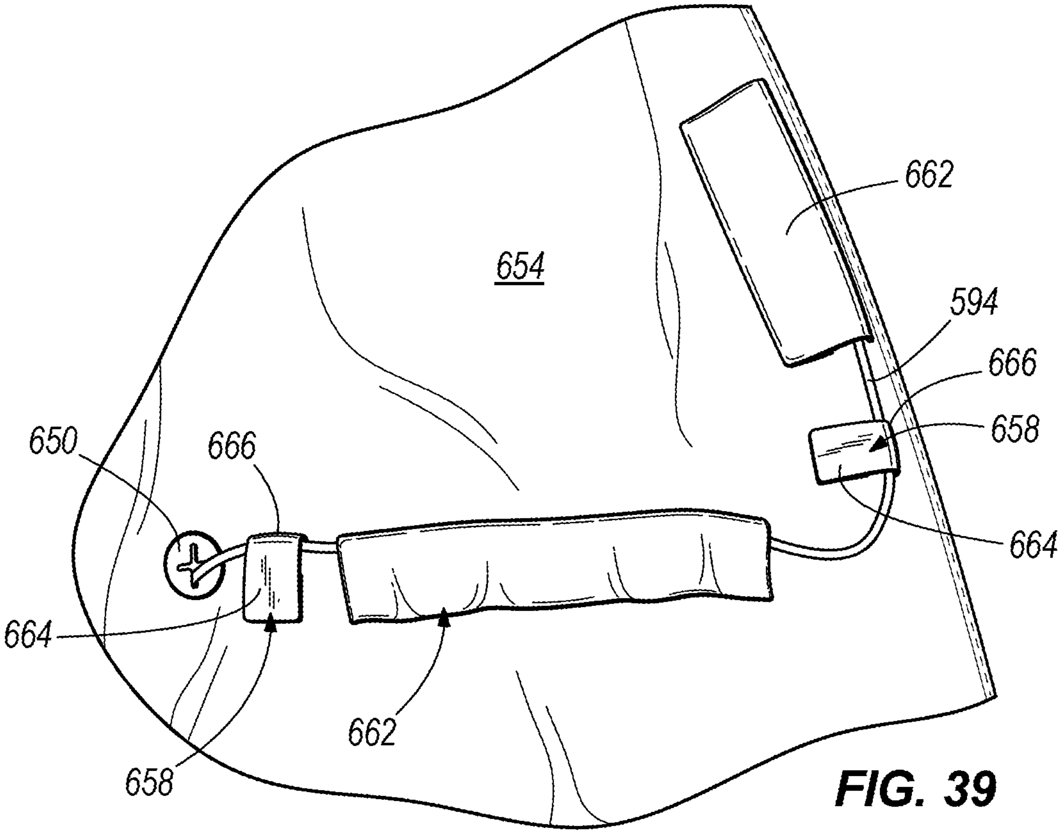
FIG. 39 illustrates wire routing features on a lining of the jacket of FIG. 27.
Figure 40:
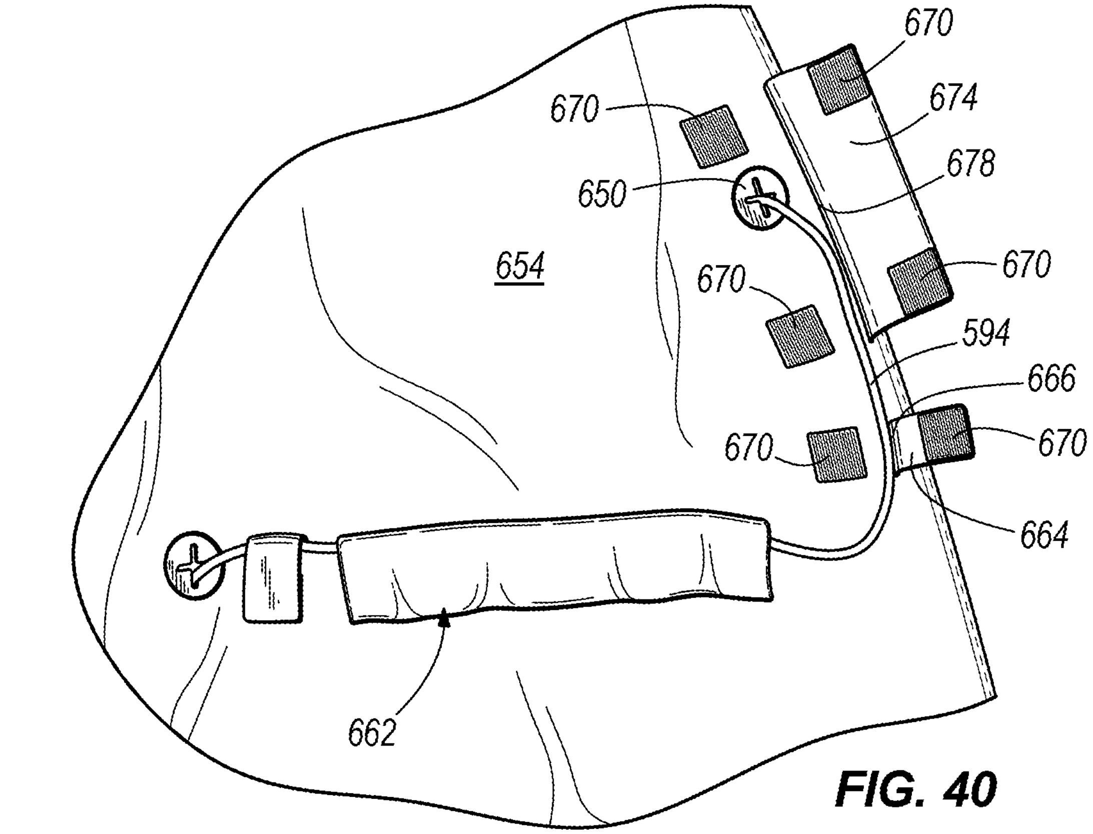
FIG. 40 also illustrates the wire routing features of FIG. 39.
Figure 41:
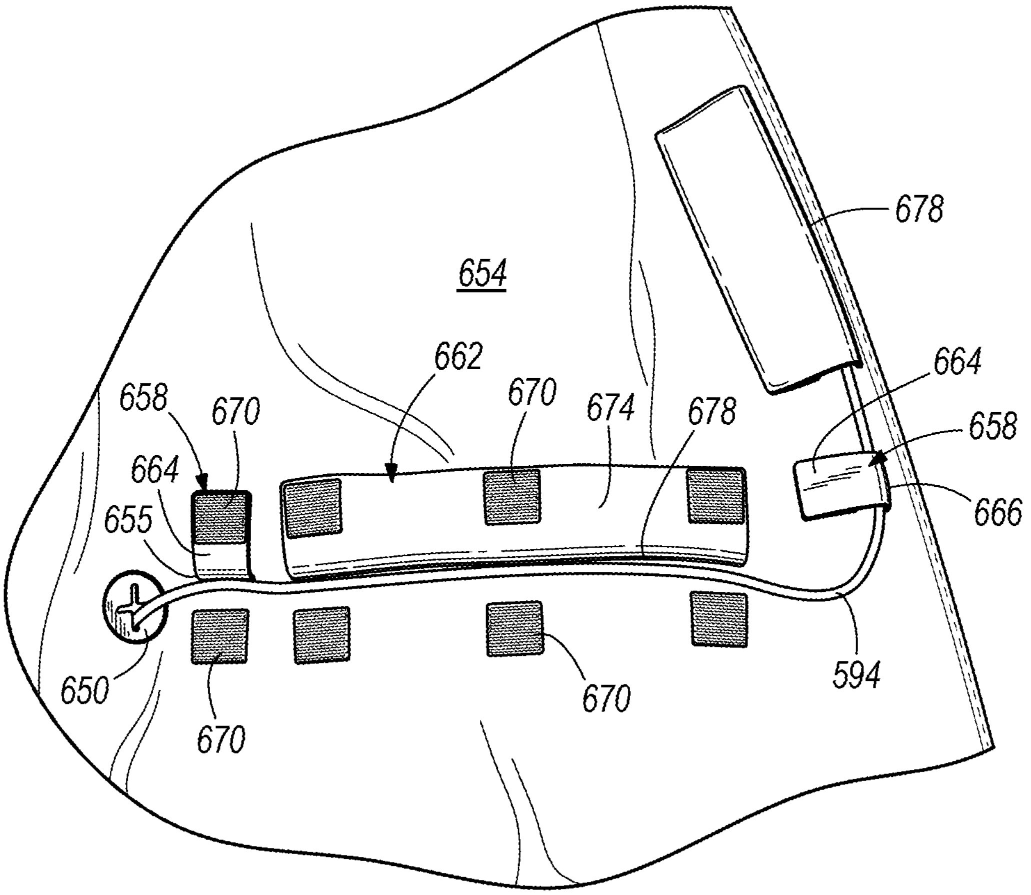
FIG. 41 also illustrates the wire routing features of FIG. 39.

FIGS. 38-41 illustrate accessory wire routing features that may be incorporated into a heated jacket, such as the heated jacket 488 of FIG. 27. Referring to FIG. 38, the rear compartment 506 may serve, for example, to hold and secure the battery receptacle 582 (FIG. 32) and battery 338 (FIG. 18). Grommets 650 are coupled to the jacket shell 492 inside the rear compartment 506. The grommets 650 surround openings through the jacket shell. FIGS. 39-41 illustrate a liner 654 of the jacket 488. The jacket 488 defines an open space between the outer shell 492 (FIG. 38) and the liner 654 (FIGS. 39-41). Grommets 650 are coupled to the liner 654 and surround openings through the liner 654. The grommets 650 facilitate the passage of accessory wires from the liner 654, through the open space, and through the outer shell 492 to the rear compartment 506. For example, a USB-type wire 594 of a device may be coupled to the accessory port 590 of a battery receptacle 582 (FIGS. 32-33) that is stored in the rear compartment (FIG. 38) 506.

Referring to FIGS. 39-41, additional wire routing features are coupled to the jacket liner 654. These additional features include wire routing tabs 658 and wire routing channels 662.

The wire routing tabs 658 include a cloth tab member 664 that is sewn to the liner 654 along a tab seam 666. Opposite the tab seam 666, hook and loop fasteners 670 are coupled to the tab members 662 and jacket liner 654, to facilitate capturing a section of wire (e.g., 594) between the liner 654 and the tab member 664.

The wire routing channels 662 include a cloth channel member 674 that is sewn to the liner 654 along a channel seam 678. Opposite the channel seam 678, hook and loop fasteners 670 are coupled to the channel member 674 and the jacket liner 654, to facilitate capturing a section of wire 594 between the liner 654 and the channel member 674. In other embodiments, the hook and loop fasteners 670 of the wire routing tabs 658 and wire routing channels 662 may be replaced with buttons, snaps, or other types of fasteners.

Figure 42:
FIG. 42 illustrates a front of a jacket with visibility features.
Figure 43:
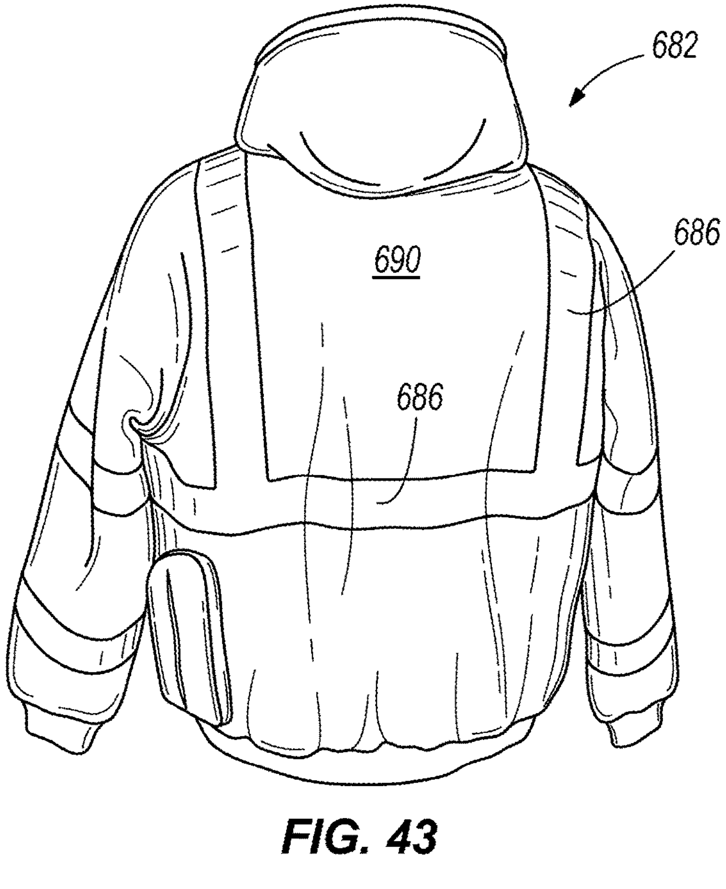
FIG. 43 illustrates a back of a jacket with visibility features.

FIGS. 42 and 43 illustrate a jacket 682 according to another embodiment of the invention. The jacket 682 may incorporate heater and heater control features similar to those described with respect to the jacket 310 (FIG. 14) or the jacket 488 (FIG. 27), or various combinations thereof. Reflective strips 686 are coupled to an outer shell 690 of the jacket 682. The reflective strips 686 may be sewn onto the outer shell 690 of the jacket 682, or they may be adhesively bonded to the outer shell 690. In still other embodiments, the reflective strips 686 may be painted onto the outer shell 690 of the jacket.

Although the invention has been described in detail with reference to certain preferred embodiments, variations and modifications exist within the scope and spirit of one or more independent aspects of the invention as described.

What is claimed is:

1. An article of clothing comprising:

a garment body including an inner surface configured to rest against a user's body when worn and an outer surface opposite the inner surface;

a heating system coupled to the garment body, the heating system including a heater configured to heat the garment body and a heater supply cable for providing electrical power to the heater;

a battery pack including a plurality of cells for supplying power to the heating system; and a battery holder separate and removable from the garment body, the battery holder configured to receive the battery pack and configured to connect electrically to the battery pack, wherein the battery holder includes an electrical port that is selectively electrically connectable with the heater supply cable, the electrical port configured to provide electrical power from the battery pack to the heating system;

wherein the garment body includes a compartment configured to hold the battery pack and the battery holder, the garment body also including a closure configured for closing the compartment and opening the compartment to provide selective access to the battery pack and the battery holder such that the battery pack and the battery holder are removable from the compartment, wherein the heater supply cable extends into the compartment to electrically connect with the battery holder while the compartment is closed, and wherein the battery holder is removable from the compartment when the heater supply cable is disconnected from the electrical port.

2. The article of clothing of claim 1, wherein the battery holder includes a housing portion configured to house a circuit board.

3. The article of clothing of claim 1, wherein the battery holder includes:

power terminals configured to mate with corresponding power terminals on the battery pack, and communication terminals configured to mate with corresponding communication terminals on the battery pack.

4. The article of clothing of claim 1, wherein the battery holder includes a USB port for charging other devices.

5. The article of clothing of claim 1, further comprising a controller for selectively providing power from the battery pack to the heater.

6. The article of clothing of claim 5, further comprising a user input member for selecting a mode of the controller.

7. The article of clothing of claim 5, wherein the controller is configured to monitor a condition of a heating zone.

8. The article of clothing of claim 1, wherein each of the plurality of cells has a capacity rating of at least 1.2 Ah.

9. The article of clothing of claim 1, wherein the battery pack has a nominal voltage of at least 10.8 volts.

10. An article of clothing comprising:

a garment body including an inner surface configured to rest against a user's body when worn and an outer surface opposite the inner surface;

a heater coupled to the garment body;

a heater supply cable in electrical communication with the heater;

a battery pack including a plurality of cells for supplying power to the heater; and a battery holder separate and removable from the garment body, the battery holder configured to detachably latch to the battery pack and configured to connect electrically to the battery pack, the battery holder including an electrical port that is selectively electrically connectable with the heater supply cable for providing electrical power from the battery pack to the heater;

wherein the garment body includes a compartment configured to hold the battery pack and the battery holder, the garment body also including a closure configured for closing the compartment and opening the compartment, wherein the heater supply cable extends from the garment body into the compartment to electrically connect to the battery holder while the compartment is closed, and wherein the battery holder is removable from the compartment when the heater supply cable is disconnected from the electrical port.

11. The article of clothing of claim 10, wherein the battery back and the battery holder each include a portion of a latching arrangement for detachably latching the battery holder to the battery pack, wherein the latching arrangement includes:

latching tabs configured to mate with corresponding recesses, and actuating portions coupled to the latching tabs and configured to selectively disengage the latching tabs from the recesses.

12. The article of clothing of claim 10, wherein the battery holder includes:

power terminals configured to mate with corresponding power terminals on the battery pack, and communication terminals configured to mate with corresponding communication terminals on the battery pack.

13. The article of clothing of claim 10, wherein the battery holder includes a housing portion configured to house a circuit board.

14. The article of clothing of claim 10, wherein the battery holder includes a USB port for charging other devices.

15. An article of clothing comprising:

a garment body;

a heater coupled to the garment body;

a heater supply cable in electrical communication with the heater;

a battery pack including a plurality of cells configured to supply power to the heater; and a battery holder separate and removable from the garment body, the battery holder configured to receive the battery pack and configured to connect electrically to the battery pack, wherein the battery holder includes an electrical port that is electrically connectable with the heater supply cable;

wherein the garment body includes a compartment configured to receive the battery pack and the battery holder, the garment body also including a closure configured for closing the compartment and opening the compartment, wherein the heater supply cable extends into the compartment for electrically connecting with the battery holder.

16. The article of clothing of claim 15, wherein the battery holder includes a housing portion configured to house a circuit board.

17. The article of clothing of claim 15, wherein the battery holder includes:

power terminals configured to mate with corresponding power terminals on the battery pack, and communication terminals configured to mate with corresponding communication terminals on the battery pack.

18. The article of clothing of claim 15, wherein the battery holder includes a USB port for charging other devices.

19. The article of clothing of claim 15, further comprising a controller for selectively providing power from the battery pack to the heater, and a user input member for selecting a mode of the controller.

20. The article of claim 15, wherein the battery holder includes an on/off button, a control button, or a display, or any combination thereof.

* * * * *